(12) United States Patent
Smith, II et al.

(10) Patent No.: US 7,006,242 B2
(45) Date of Patent: *Feb. 28, 2006

(54) PRINTING PORTABLE-SELECTED INFORMATION

(75) Inventors: Donald X. Smith, II, Corvallis, OR (US); Aloke Gupta, Corvallis, OR (US); Charlie Udom, Corvallis, OR (US); John Atwood, Corvallis, OR (US); Keith M. Taylor, Corvallis, OR (US); William P. Brown, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

This patent is subject to a terminal disclaimer.

(21) Appl. No.: 10/045,945

(22) Filed: Oct. 22, 2001

(65) Prior Publication Data

US 2002/0113994 A1 Aug. 22, 2002

Related U.S. Application Data

(63) Continuation-in-part of application No. 09/917,016, filed on Jul. 26, 2001, and a continuation-in-part of application No. 09/678,648, filed on Oct. 3, 2000, now abandoned.

(51) Int. Cl.
*G06K 15/00* (2006.01)

(52) U.S. Cl. ................................ 358/1.15; 358/1.6
(58) Field of Classification Search ................ 358/1.1, 358/1.6, 1.14, 1.15, 401, 402, 403, 471, 473, 358/1.16
See application file for complete search history.

(56) References Cited

U.S. PATENT DOCUMENTS

2002/0078174 A1 * 6/2002 Sim et al. .................. 709/219
2002/0113994 A1 * 8/2002 Smith et al. ............... 358/1.15

OTHER PUBLICATIONS

'Bachmann Software Products Center' from Bachmann Software & Servicesweb page http://www.bachmannsoftware.com/products.htm pp1–3 printed Jan. 10, 2001.

* cited by examiner

Primary Examiner—Arthur G. Evans
(74) Attorney, Agent, or Firm—Raymond A. Jenski

(57) ABSTRACT

A user of a portable device may request a full-length information set be sent to a high capacity presentation apparatus for printing. A truncated or compressed information set is displayed on the portable device, which the user may select for later printing of the full-length information on the high capacity presentation apparatus when the portable device is synchronized.

15 Claims, 20 Drawing Sheets

○ Halv7 . Com    update:
                 Aug. 31

HP Jornada Voted Best in Class

The HP Jornada 540 Series Color Pocket PC offered by Hewlett-Packard Company was selected by the users......

Advertisement continued.....

Fig. 4

PRINTING PORTABLE-SELECTED INFORMATION

The present application is a Continuation-in-Part of U.S. patent application Ser. No. 09/917,016 "Versatile Printing from Portable Electronic Device", filed on Jul. 26, 2001 on behalf of Udom et al., and of U.S. patent application Ser. No. 09/678,648, "Full Information Set Delivery", filed on Oct. 3, 2000 now abandoned on behalf of Brown, both of which are assigned to the assignee of the present invention.

BACKGROUND

The present invention is generally related to the printing of information and more particularly to a method and apparatus essentially for delaying the printing of displayed content on a portable communications device until the device is coupled to a high capacity presentation apparatus. Reference is made to copending application for patent, U.S. patent application Ser. No. 09/917,010, "Presentation of Automated Personalized Television Programming with Preference Notations Using a Wireless Hand-Held Computing Device", filed on Jul. 26, 2001 on behalf of Brown et al., which may contain related matter.

Portable and hand carried devices that link users to communication services have become increasingly popular and widespread. Cellular telephones, as an example, are routinely carried by people and are generally expected by their users to provide two way voice communication virtually anywhere. The increasing involvement people are having with the Internet (or world wide web) and other digital two way communication services at a fixed location, such as a home computer, have spurred the development of portable interconnections to the Internet. The world wide web (Web) allows users to navigate Internet resources intuitively, without using internet protocol (IP) addresses or other special technical knowledge. The Web is made up of interconnected "web pages", or web documents. These pages are accessed with the use of a web "browser". The Web uses a transfer method known as "http" (Hypertext Transfer Protocol). One format for information transfer is to create documents using Hypertext Markup Language (HTML). HTML pages are made up of standard text as well as formatting codes that indicate how the page should be displayed. A browser reads these codes in order to display the page. Each web page may contain graphics, video, and audio information in addition to text. Hidden behind certain text, pictures, or sounds are connections, known as "hypertext links" ("links"), to other pages within the same server or on other computers within the Internet. Each link is directed to a web page by a Uniform Resource Locator (URL). A user may also specify a known URL by writing it directly into the command line of a web browser.

Cellular telephones are being produced with features that encourage connection to and are compatible with the Internet. Likewise, developments in personal digital assistants (PDAs) have moved these products from mundane calendaring devices to nearly full-capability computing devices. Synchronization between a PDA and a user's full-capability computer (or computer network) provides an opportunity for e-mail to be downloaded to the PDA, calendar and schedule changes to be recorded, and other updates to be made to information stored in the PDA. The PDA user may then, at leisure, review the updated information. Like PDAs and cellular telephones, pagers and paging devices are also experiencing enhanced digital capabilities leading to interfaces with the Web.

When compared to the high capacity communications and presentation capacity of a user's personal computer system, the foregoing portable devices can be viewed as limited-capacity presentation apparatuses. A user can download a web page from a server coupled to the Web and then print the web page. However, a portable device typically has limited storage space, display size, and communication speed that can hinder the ability to efficiently display and print full length, rich content generally encountered from the Web. Nevertheless, portable devices offer radio frequency interconnection to an internet service provider (ISP) thence to the Web and have been provided the capability of receiving content when the user is logged-on. This content is then displayed on a limited capacity screen. The information shown can be a truncated or summarized version of a full length story, compressed to fit the limited capacity screen. Additionally, subscribers to news services and the like can have late breaking news stories e-mailed to their fixed computer system, which has a comparatively non-limited capacity memory and display screen.

Further, portable devices (especially PDAs) are often equipped to allow printing from the portable device to a printer via an infrared (IR) link. The print driver on a typical PDA exists as a separate non-integrated application that prints documents residing in the PDA. The richness, as well as the number, of large-sized documents that can be printed from the PDA is limited by the relatively low storage capacity of PDAs. In addition, delivery of very large-sized documents to PDAs (especially through a wireless connection) is slow and thus not well accepted.

SUMMARY OF THE INVENTION

The present invention encompasses the method and apparatus for printing information selected at a portable device. Information is accessed from a remote server. A truncated portion of the information is received and displayed at the portable device. An activation to print the information is accepted at the portable device while the truncated information is displayed and is stored in the portable device as an indication of the activation. A coupling to a high capacity presentation apparatus is detected and the stored indication is conveyed to the high capacity presentation apparatus in response to the detection, whereby the high capacity presentation apparatus obtains and prints the information.

BRIEF DESCRIPTION OF THE DRAWINGS

FIG. 4 is an illustration of a web page example of a high capacity presentation apparatus that may employ the present invention.

DETAILED DESCRIPTION OF A PREFERRED EMBODIMENT

The present invention encompasses method and apparatus that delivers full length, truncated, or summarized information to a user's cellular telephone, PDA, pager, or similar human-perceptible, limited-capacity presentation apparatus. From the truncated information set, a full length information set can be requested to be delivered at a later time to a communications apparatus having a high capacity presentation capability, such as a computer system with capabilities for a printer, a video display, an e-mail message file, a web page, or similar high capacity presentation apparatus. Likewise, a full length information set can be directly delivered at a later time to such a high capacity system.

Figure 1:
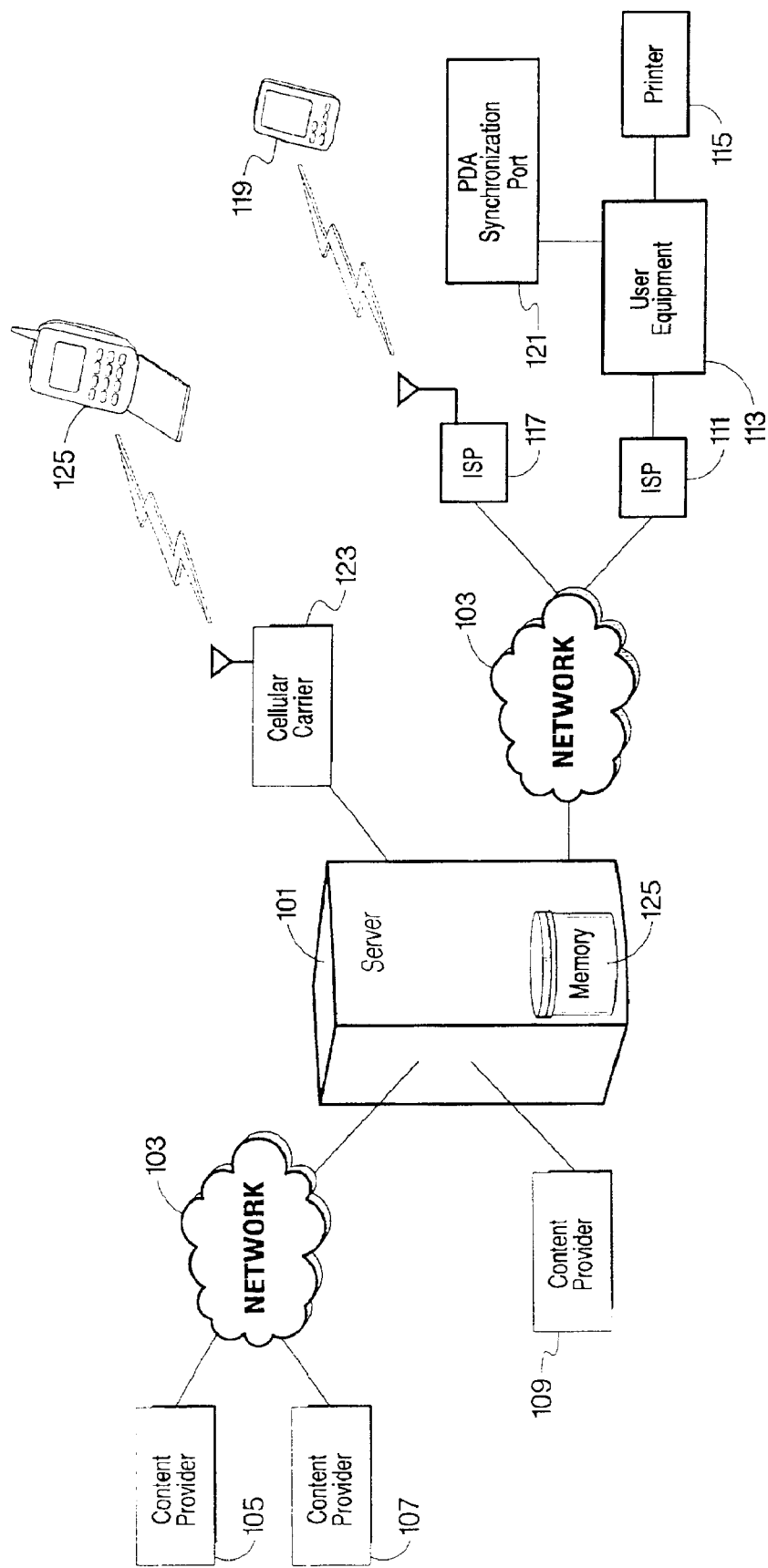
FIG. 1 is a block diagram of a communications arrangement that may employ the present invention.

A block diagram of a communication arrangement that may employ the present invention is shown in FIG. 1. A server 101, which is of a type generally known, is configured to provide an information delivery service to users. Interconnection between the server 101 and a network 103, such as the Internet, is conventionally accomplished to provide communication channels to content providers 105, 107 and users of the information delivery service. The interconnections shown are, of course, representative since the communication between the server, the content providers, and users is expected to be flexible. Accordingly, another of the content providers 109 is shown as having a direct connection to the server.

Information can be delivered to a user by way of an internet service provider (ISP) 111, the user's own equipment 113 (for example a computer and modem), and a human-perceptible presentation apparatus such as a printer 115. Or, information may be carried by an ISP 117 to a two way radio frequency apparatus and transmitted to a portable device, for example a wireless PDA 119, for presentation to the user on the PDA display. The wireless PDA 119, as well as non-wireless PDAs, usually have the capability of synchronizing with the user's home (or work) computer system. A PDA synchronization port 121 is shown, which provides synchronization of the PDA with the user computer equipment 113 and information delivery when the PDA is proximate to (for example, in electrical contact or within a short-range electromagnetic propagation distance such as may be expected from infrared or Bluetooth-type links) the synchronization port 121. A cellular carrier 123 may also deliver information from the server 101, or from the network 103, to a user's cellular radiotelephone 125. A related information delivery system is that of a paging service (not shown), which accepts information from the server and delivers it via electromagnetic wave propagation to a user's pager.

In one embodiment of the present invention, a user arranges with an information delivery service provider associated with the server 101 to have information delivered to the user's portable device. As part of the arrangement, the user provides profile data that, inter alia, characterizes the user's preferred portable device and a preferred high capacity presentation apparatus such as the user's computer and its peripherals. This profile data is stored in server memory 125. If it is assumed that a user has a wireless PDA and desires full information sent to a printer 115 coupled to the high capacity user computer equipment 113, a truncated information set will be generated for transmission to the PDA while the full information set is reserved to be sent to the printer. A specific example helps bring this service into focus. Assume the user has specified that information relating to stock market quotations for Corporation A be transmitted to the user's PDA when the PDA is operated as a portable and is logged-on to the service. The information delivery service server 101, via the network 103, obtains stock market information from the content provider 105. Included among the obtained stock market information are stock quotation headlines and summaries as well as detailed analyses and company profiles. (In an alternative embodiment, the information delivery service server itself extracts or truncates information obtained from a content provider). Since the user has specified that information be sent to the user's PDA, a Company A stock market quotation headline (or other information truncation) is formatted for the limited capacity PDA screen and transmitted by way of the network 103 to the ISP 117 for radio transmission to the wireless PDA 119.

The user may have an interest in the more detailed analysis and can select an indicator of these analysis to be returned to the information service provider. The selection is transmitted by the PDA 119 to the ISP 117 and this selection signal is conveyed back to the server 101 via network 103. As specified in the user's profile in memory 125, the high capacity presentation apparatus includes the printer 115. The full length press release is formatted for the printer by the server 101 and sent to the printer for a hard copy print of the press release to be created. In an advanced version of the server, a successful completion of the print job is received from the user equipment 113 and the server 101 transmits a notification of the successful printing to the PDA 119.

A feature of the present invention enables the user to request printing of content even when the portable device (PDA) is not logged-on to the service. Information related to the stock market quotations for Corporation A, mentioned previously, are transmitted from the delivery service server 101 to the PDA 119 as part of the user's specification to the delivery service provider. Within the information delivered are software tags indicating that additional information is available for parts of the delivered information and an invitation for the user to "click" on a manifestation of the additional information's availability, such as a pseudo-hypertext indication understandable to the user (or, alternatively, on a "print button" soft key on the portable device's screen or on a dedicated "print" button hard key on the PDA body) to obtain a hardcopy print of the additional information. Thus, the user's PDA receives the truncated information with tags. The user causes the portable device to display the received information at a time when the portable device is no longer in communication with the delivery service server. The activation by the user of the displayed manifestation (or print button) places a marker in the portable unit's memory that directs the user's computer equipment 113 to connect with the delivery service server 101 at a time when the portable device is coupled to the user equipment, such as via the PDA synchronization port 121.

Once the computer equipment makes connection to the service provider's server, the equipment 113 requests delivery of the additional full-length information corresponding to the marker. The user computer equipment 113 subsequently prints the full-length information on the printer 115.

Figure 2:
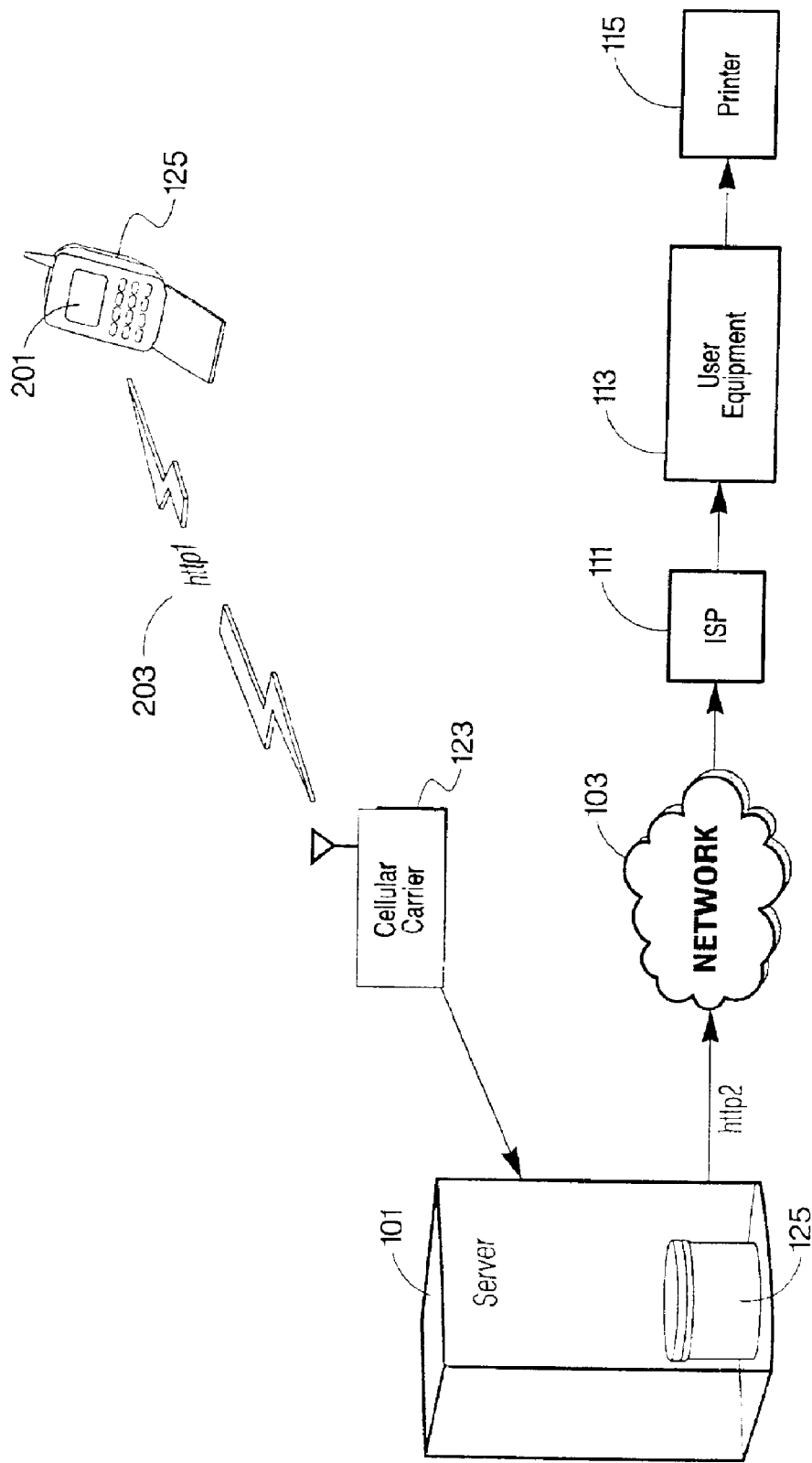
FIG. 2 is a block diagram of a communications arrangement for a specific example of information delivery that may be employed in the present invention.

A second example of information delivery which may employ the present invention is illustrated in FIG. 2. In this example, a news service providing alerts to a cellular telephone 125 accomplishes this task from its server 101 via the cellular carrier 123. The display screen 201 of the cellular telephone makes the news alerts perceptible by the human user. An example of two news alerts are illustrated on the screen of FIG. 3A. Only a limited number of characters for each line of the display are available and only a limited number of lines may be used. The user may scroll through the lines for topics of interest. Here, the user views, and the cellular telephone highlights, one of the lines, for example line 301. It is this line for which the user would like to have more information, in fact, a full length report of the topic highlighted. Once the line is highlighted, the user is invited to select a delivery mode by using one of the soft keys at the bottom of the cellular telephone display. In this embodiment, two choices are available: OK and MORE. The user selects the OK soft key 303, which means that the user wants the full length content delivered to the high capacity presentation capability device that was previously selected when the user established the user's profile with the service provider. The cellular telephone, in the preferred embodiment, composes an HTTP formatted signal (illustrated as radio message 203 in FIG. 2), including an identification of the truncated content (for example #1234), a pre-established user identification number (for example #432), and a selection of the high capacity presentation capability device (which, in this example, is mi=cell, the code for the high capacity presentation apparatus stored in the user's profile). In a preferred embodiment, this signal, http1, is of the form: http://server/wap?PubID=1234?UID=432?Mi=cell.

The signal 203 is passed by the cellular carrier 123 to the server 101. The server 101 receives the request signal, identifies the user, recalls the default high capacity presentation capability device characteristics from the user's profile, formats the full-length information accordingly and sends the formatted full length information to the selected high capacity presentation capability device. In this second example, the user's default (pre-stored profile selection) high capacity presentation apparatus is a printer peripheral to a computer. Thus, the full-length information (which is preferably stored at the server in XML format) is reformatted into a format compatible with the user computer equipment and printer and sent, via any intervening network 103 and ISP 111 to the user equipment 113 and printer 115. In one embodiment, the reformatted full length information set, http2, is reformatted into http format.

Figure 3A:
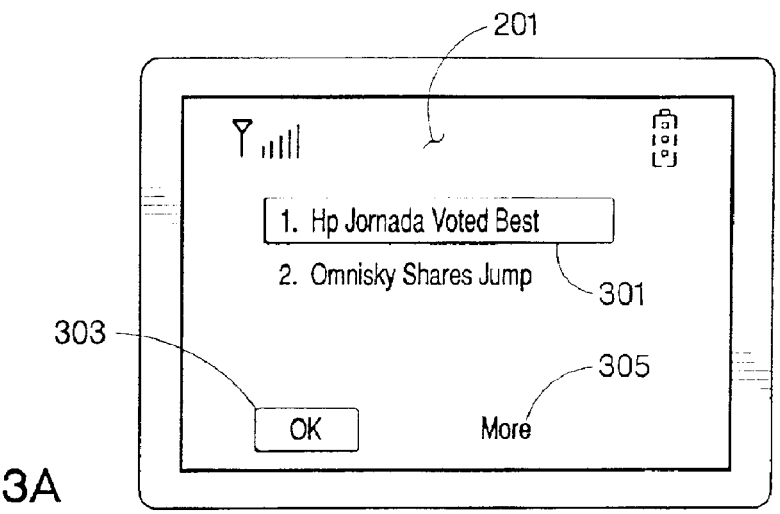
FIGS. 3A, 3B, and 3C are illustrations of a display screen for a limited capacity presentation apparatus that may employ the present invention.
Figure 3B:
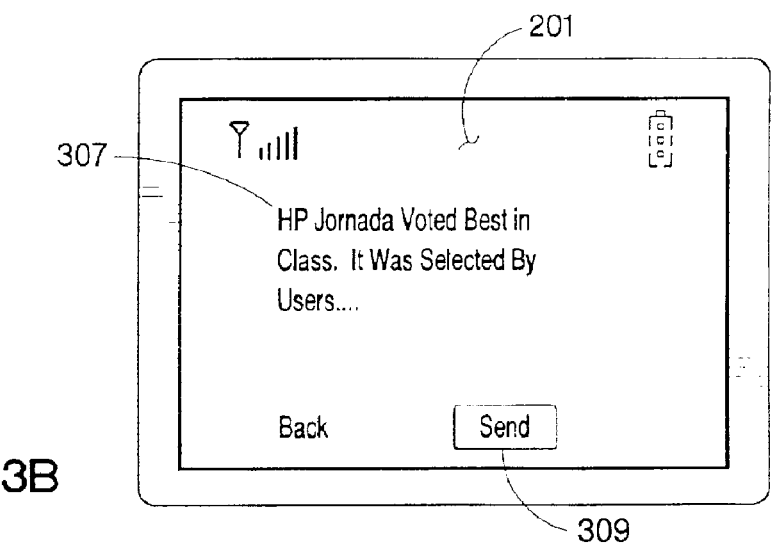
Figure 3C:
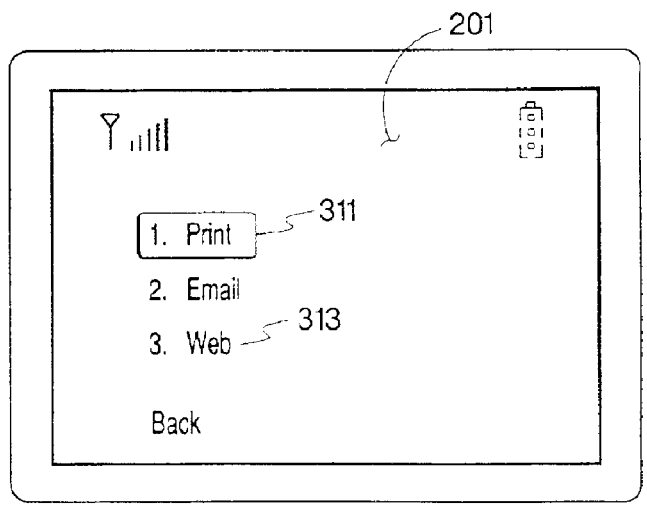

FIGS. 3A, 3B, and 3C depict the display screen 201 visible on a portable cellular telephone 125. The user could have selected the MORE soft key 305 (FIG. 3A) on the cellular telephone to present a second display screen (illustrated in FIG. 3B) to the user. This second screen, in a preferred embodiment, provides a short abstract 307 of the highlighted title information of the first screen (FIG. 3A). Assuming that the user wishes to select a high capacity presentation apparatus rather than that predetermined as part of the user's profile, the user activates the SEND soft key 309, which leads to a third screen, illustrated in FIG. 3C. The user can scroll through the high capacity presentation apparatus available that are displayed on this screen. In this example, the user selects PRINT, 311, to cause the full length information set related to the selected truncated information set headline 301 and abstract 307 to be sent to the user's printer 115. The signal returned to the server contains the indication "print" rather than "cell", and the server formats for the user selected high capacity presentation apparatus rather than for the profile-stored high capacity presentation apparatus.

If the user had selected WEB, 313, the signal returned to the server would contain "web" to indicate that the user desired the full length information set to be displayed on a web page. The server 101, as a result, sets the high capacity presentation aparatus to the characteristics of a web page and the full-length information would be reformatted from XML to HTML compatible with a web page. This formatted full-length information is then sent to the web page for the user. In one embodiment, the web page is hosted by the server itself. Effectively, the server 101 can be accessed in this mode as a conventional Internet web site and pages browsed in a conventional form. In fact, the information service provider may have a publicly accessible web information site. Uniquely available to a subscribing user, in a preferred embodiment, is a web page that displays full-length information selected by the user when using the user's limited capacity presentation apparatus. In the current example, the user highlighted a line activated the WEB option 313. The server 101 placed the full-length information on the unique web page for the user. An illustration of such a web page is shown in FIG. 4.

The design of the web page and the mechanism for limiting access to the user is a choice left to the information service provider. Thus, the information service provider's identifying marks 401, ancillary information 403, and advertising 405 are placed at the service provider's option. The full-length message 407 is displayed for the user to read at leisure. It should be noted that the truncated information in the present example is a true truncation of the title of the full-length information. The information service provider (or the original content provider) may have the capacity to summarize or headline the full-length information in other meaningful ways. The inventors of the present invention use the word truncation in a broad sense to encompass summarizing, headlining, keyword selecting, or other human-understandable meaning compression for use in the limited capacity presentation apparatus.

Figure 5:
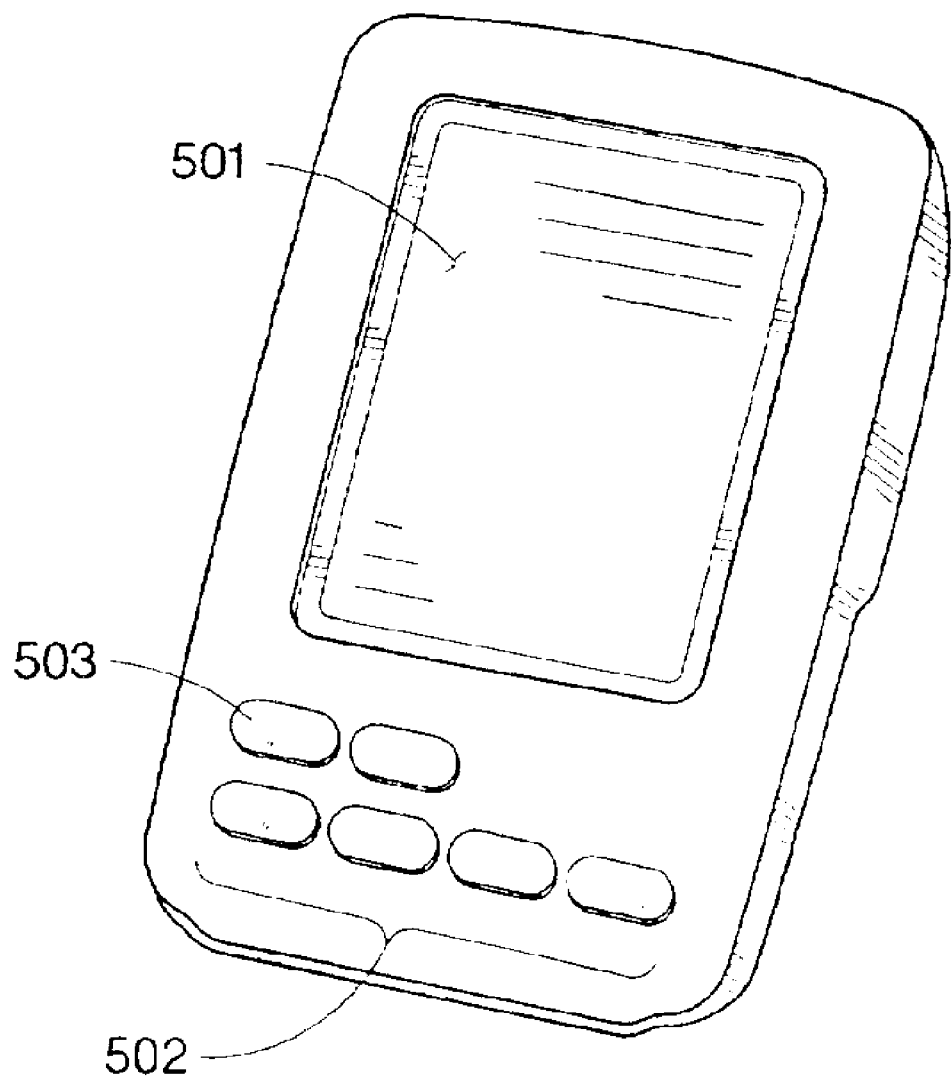
FIG. 5 is an illustration of a portable device having limited display capacity which may be employed in the present invention.

An exemplary portable device is depicted in FIG. 5 as a PDA 119. The PDA 119 includes hard keys 502 and a display 501. The display 501 has a limited capacity so, in an embodiment of the present invention, the information displayed is a truncated version of the full-length information available. The user may decide to print a full-length version at a remotely connected printer, to view the information on a video screen, to direct the information to a web page for eventual viewing there, or to post the full-length information into an e-mail document, among other things. Considering first the printing selection in detail, a mobile print button 503 hard key offers a first alternative to allow a user to access versatile printing options that allow any time and anywhere printing of full-length information. A second alternative for making a print selection is that of selection of a print icon (a soft key) displayed on display 501. The rich content full-length information set includes, for example, web pages with embedded content such as embedded ads, coupons, and so on. The printing is supplied in a single integrated solution. This print options allow a seamless printing solution for printing such rich content from portable devices, and several examples are provided below.

As a first example, the portable device 119 prints directly to a suitably equipped printer through an infrared (IR)

interface. The PDA or similar portable device also prints using a printer by uploading data through a stand-alone computing system, as a second example. The data uploaded to the stand-alone computing system includes data to be directly printed on a printer, and can include one or more references to content rich data residing on the computing system or accessible to the computing system. In this instance, a user of a portable device can select an option to print content rich data upon synchronization with the computing system. During the course of synchronization with the computing system, data to be printed, along with any references to content rich data residing on the computing system or accessible to the computing system is uploaded to the computing system and printed on the printer.

A third example includes a portable device that prints using a printer by transferring print data directly to the printer. The information transferred to the printer can include information to be directly printed on the printer, and can include one or more references to content rich information residing on or accessible to the computing system. Any references to content rich information sent to the printer is passed on to the computing system. The computing system accesses the referenced content rich information and forwards the full-length information back to the printer for printing.

As a fourth example, a portable device prints using a printer by transferring print information to the printer via the Web. The portable device makes wireless connection with the Web (network 103) via an internet service provider (ISP) 117 to transfer information to user equipment 113 for printing on the printer 115. This information can include truncated information to be directly printed on printer 115, and can include one or more references to a content rich full-information set residing on or accessible to the equipment 113.

As a fifth example, a portable device prints using a printer by transferring print data to the printer through a local network. In this example, the portable device makes wireless connection with a local network via a network service provider (NSP). A server is connected on the local network. The information transferred to the server for printing on the associated printer can include truncated information to be directly printed on the printer, and can include one or more references to content rich, full-length information residing on or accessible to the server.

Various printing technologies are combined into one module that reside on a portable device and is accessible to a browser running on the portable device. For example, if the portable device is a Pocket PC, available from Hewlett-Packard Company, the module is implemented as an ActiveX Control for Pocket Internet Explorer. If the portable device is a non-wireless Palm available from Palm, Inc., the module is implemented as a pod for the AvantGo browser. If the portable device is a wireless palm (such as a Palm VII) available from Palm, Inc., the module is implemented as a ".prc" application for the Web Clipper browser.

Figure 6:
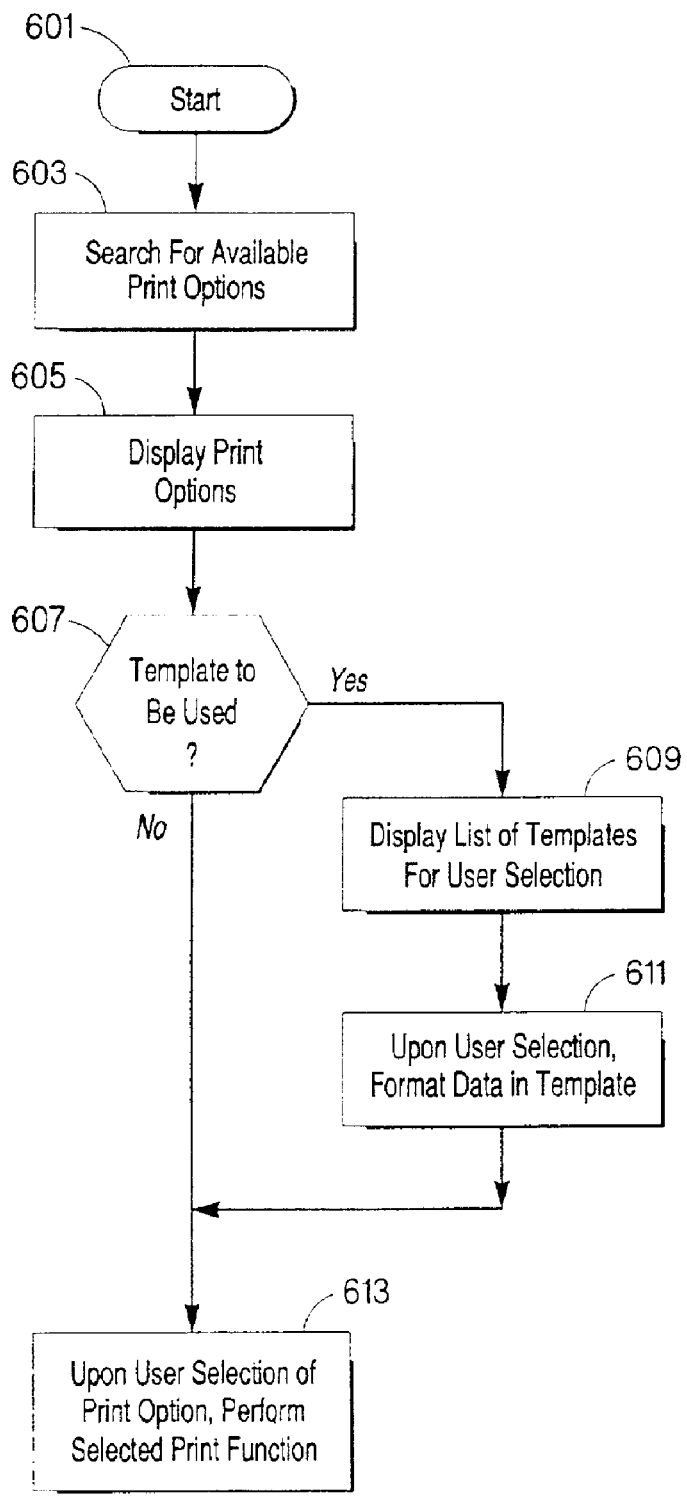
FIG. 6 is a flowchart of a print option process which may be employed in the present invention.

Activation of the hard key "print button" 503, or a soft key "print" icon on the PDA display screen, or selection of a pseudo-hypertext link in the information being displayed initiates a print option process, which is illustrated in the flowchart of FIG. 6. In step 601, the activation is detected and the process commences. In step 603, the PDA searches for available printing options. In one embodiment, only the print options that the user selected during installation are presented. The module within the PDA determines which print options to display by detecting whether or not certain sub-components are installed. The print options are displayed to the user preferably via a dialog box displayed on the display screen 501 of PDA 119, at step 605. If the user only installed components for a single print option, step 605 will be bypassed and the print action will be immediately invoked upon a user activating the print button 503.

Figure 7A:
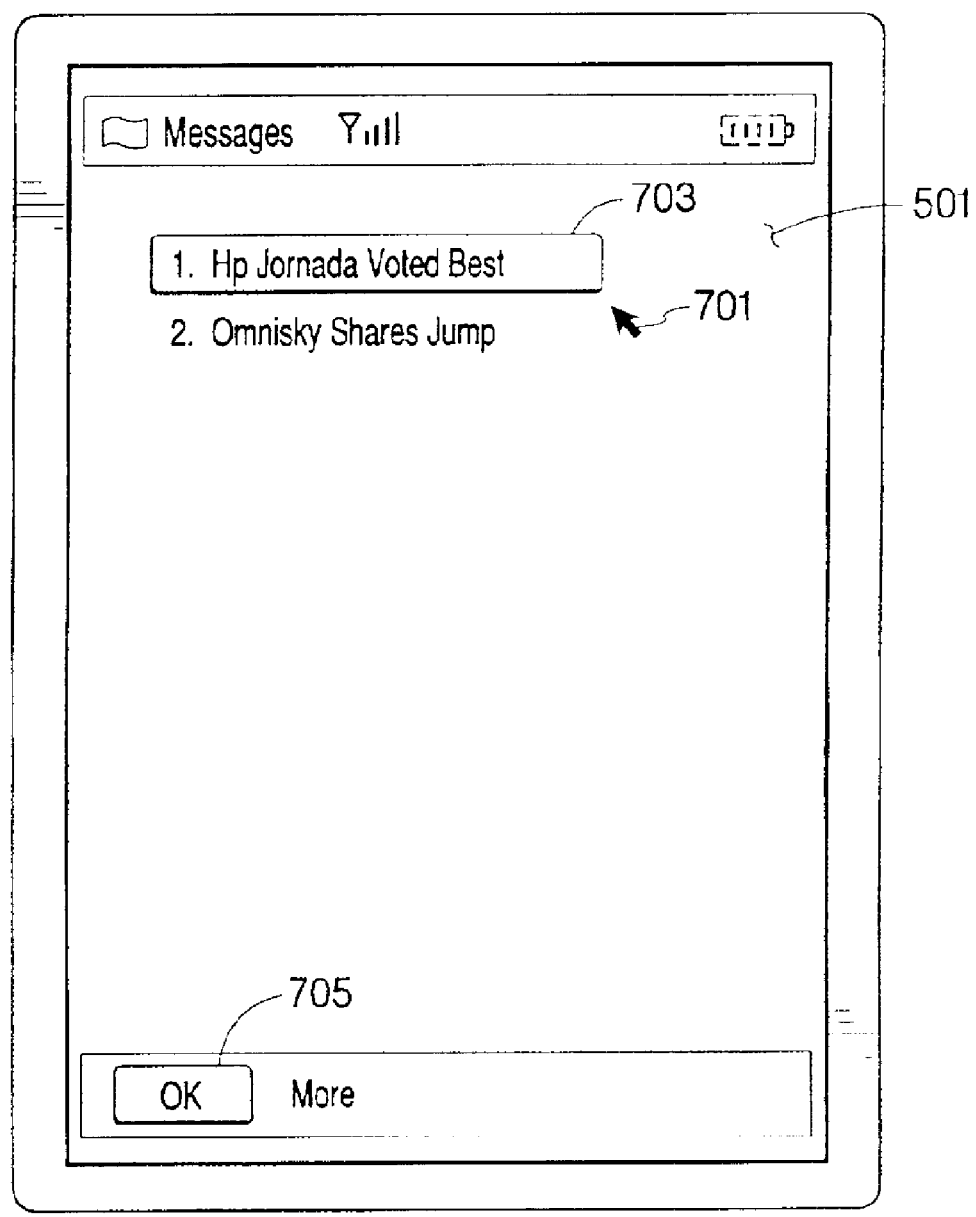
FIGS. 7A–7F are illustrations of the display screen for the portable device of FIG. 5 showing several screens encountered by the user while using the portable device.
Figure 7B:
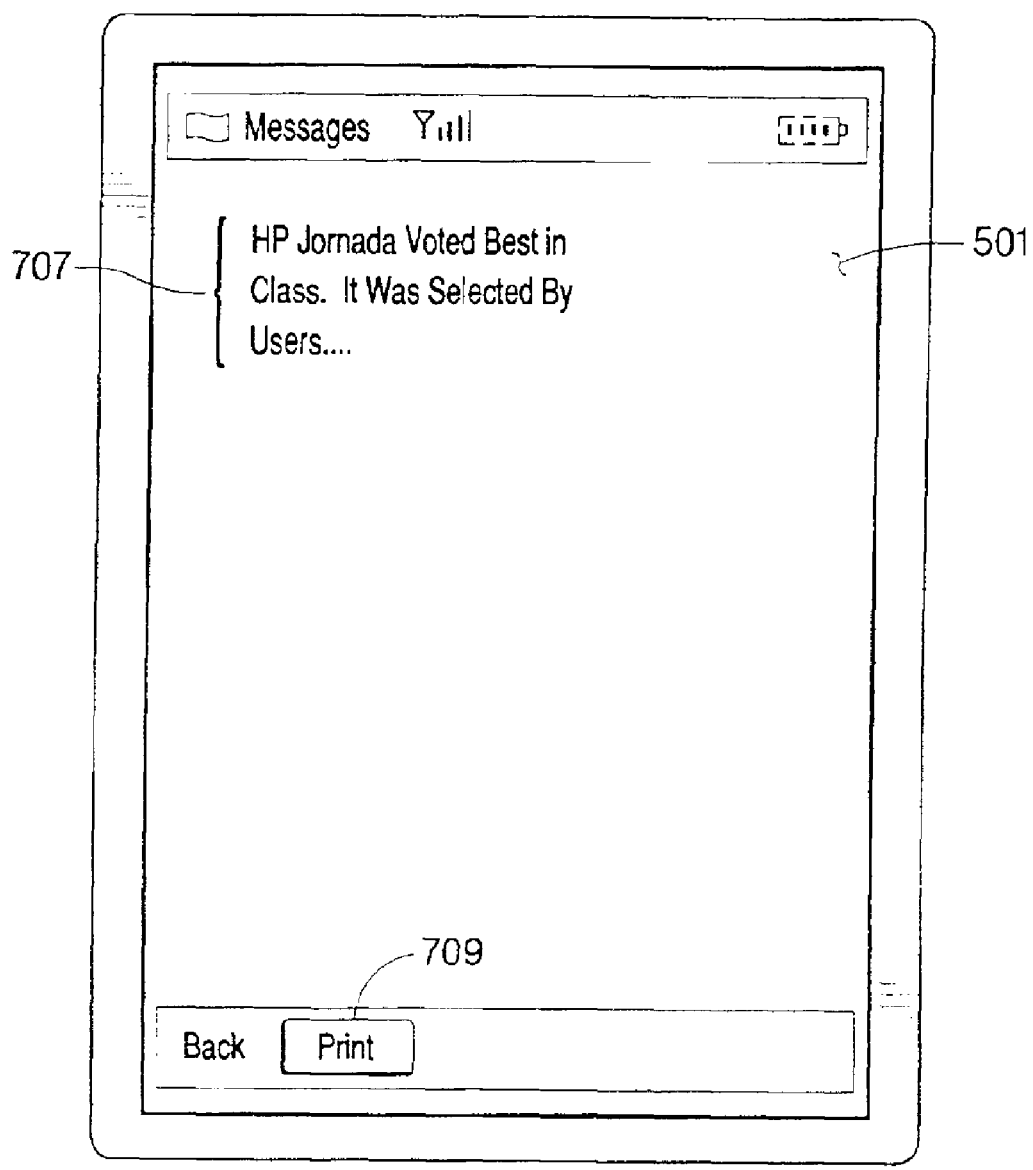
Figure 7C:
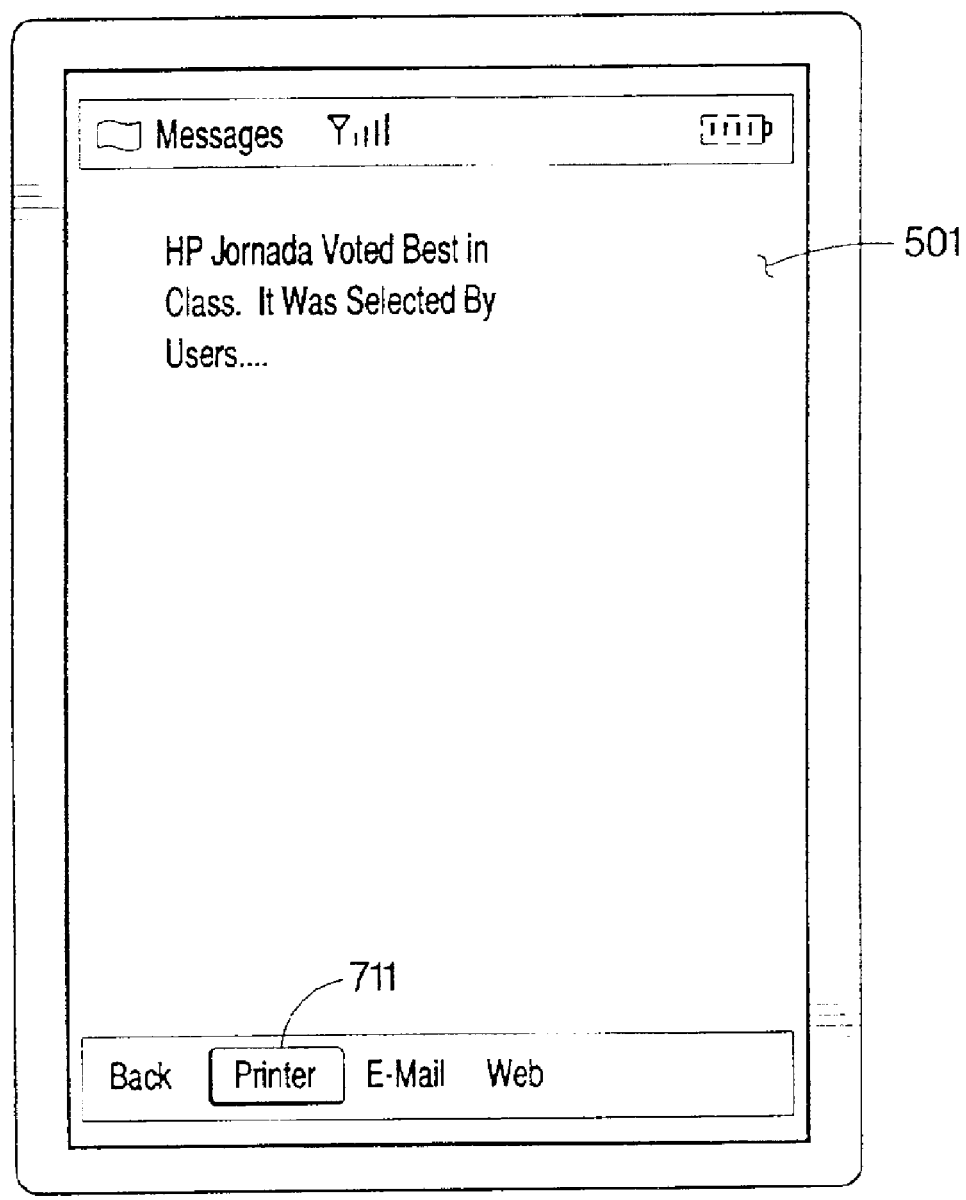
Figure 7D:
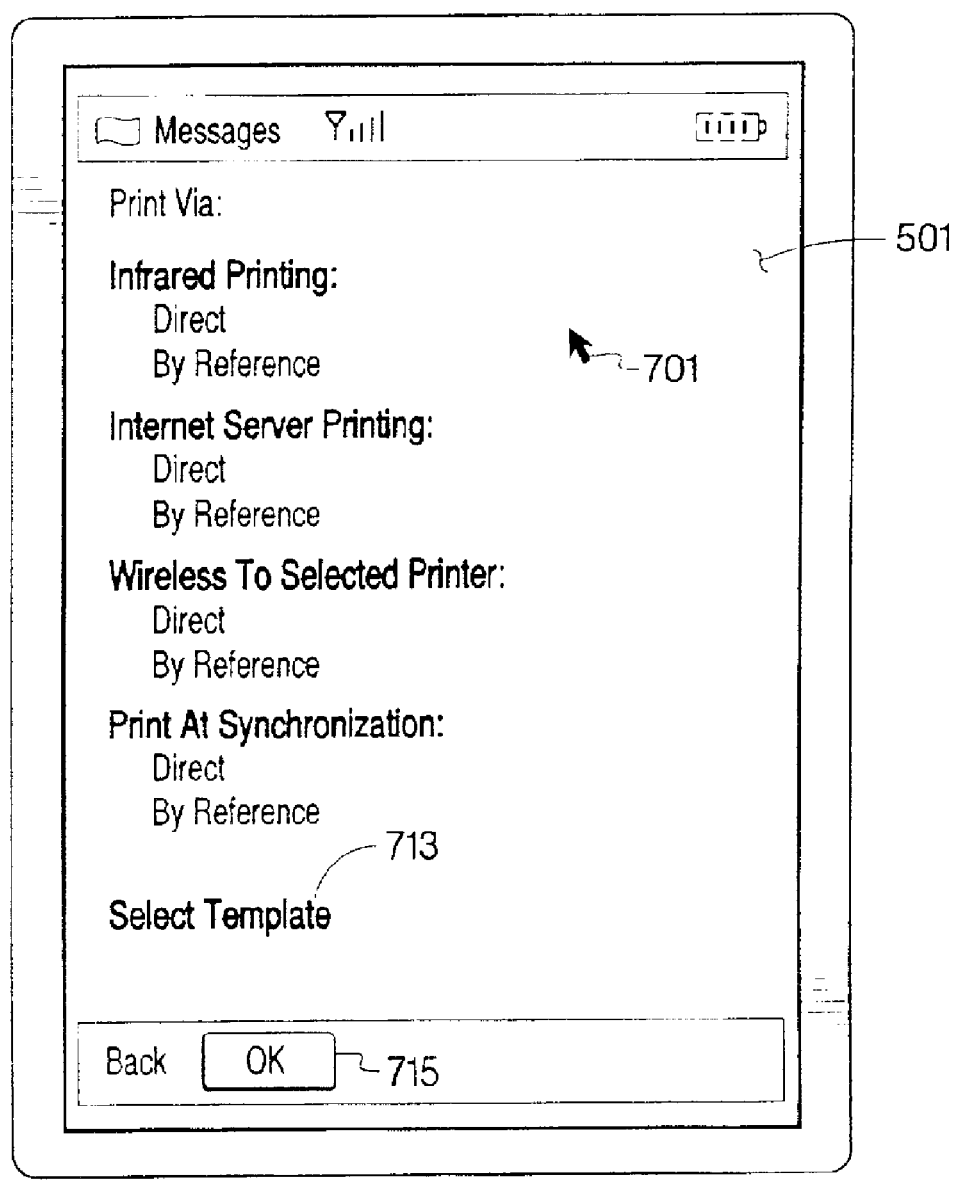

When a portable device, such as a wireless PDA, is considered, the user is provided with a wide range of variable print capabilities. Referring now to FIG. 7A, a PDA display screen 501 displays a menu of information from the service provider, similar to that discussed in association with the cellular telephone screen of FIGS. 3A, 3B, and 3C. When the user sees an item that is of interest, the user can highlight or otherwise indicate the item. (Operating systems of different PDAs operate differently, so the user's experience with each PDA is likely different. For example, a PDA may employ a cursor 701 or text highlighting 703 or text font change, or a combination of the foregoing to indicate a selection. Furthermore, the user's indication may be made using a stylus, light pen, fixed buttons, or the like to interface with the device). Once the item is indicated, the user may progress with the user's wants relative to the selected item. Here, the OK soft key 705 is activated by a stylus providing pressure on the soft key by the user. The service provider server delivers a truncated information set that is formatted for the PDA to the PDA as illustrated in FIG. 7B. The truncated information set 707 (here, shown as text only but not necessarily so limited since images and graphics and the like may also be truncated or compressed to fit in the display) is presented in the display 501. Unbeknownst to the user, the entire truncated information set is tagged by the service provider server to provide identification of the truncated information set so that the full length information set can be identified and accessed. If the user desires a copy of the full length information, the user, in the present example, activates the PRINT soft key 709. In one embodiment, another display screen, as shown in FIG. 7C, is presented to the user to offer variations in where the full length information set is directed. It may be formatted into an e-mail message or into a web page for later viewing. Here, the user is assumed to activate the PRINTER soft key 711 and the screen illustrated in FIG. 7D is presented to the user. In this illustration, print options are displayed in one area of the display 501. The displayed options include infrared printing, internet server printing, wireless to selected printer, or print at synchronization. As discussed above, infrared printing is performed to a printer in close vicinity to the PDA. Internet server printing is performed to a printer over the Web using an internet service provider. Wireless printing is performed using a wireless connection to a printer. Print at synchronization stores the print job until the PDA is synchronized with a computing system. The print job is then uploaded to the computing system for printing.

Each of the options listed in the screen options area has two sub-options. The direct printing sub-option indicates that print data is printed directly on the printer. The print by reference sub-options means that one or more references to remote data not stored on the PDA are used to access content rich full-length information from a source outside of the PDA. It is an alternative that the PDA can select the sub-option automatically. The user makes a choice based on which printing solution best fits the situation. The choice can depend, for example, on the capability of the PDA, the capability of the output device used for printing, the availability of various output devices, the availability of a wireless service, and so on.

Figure 7E:
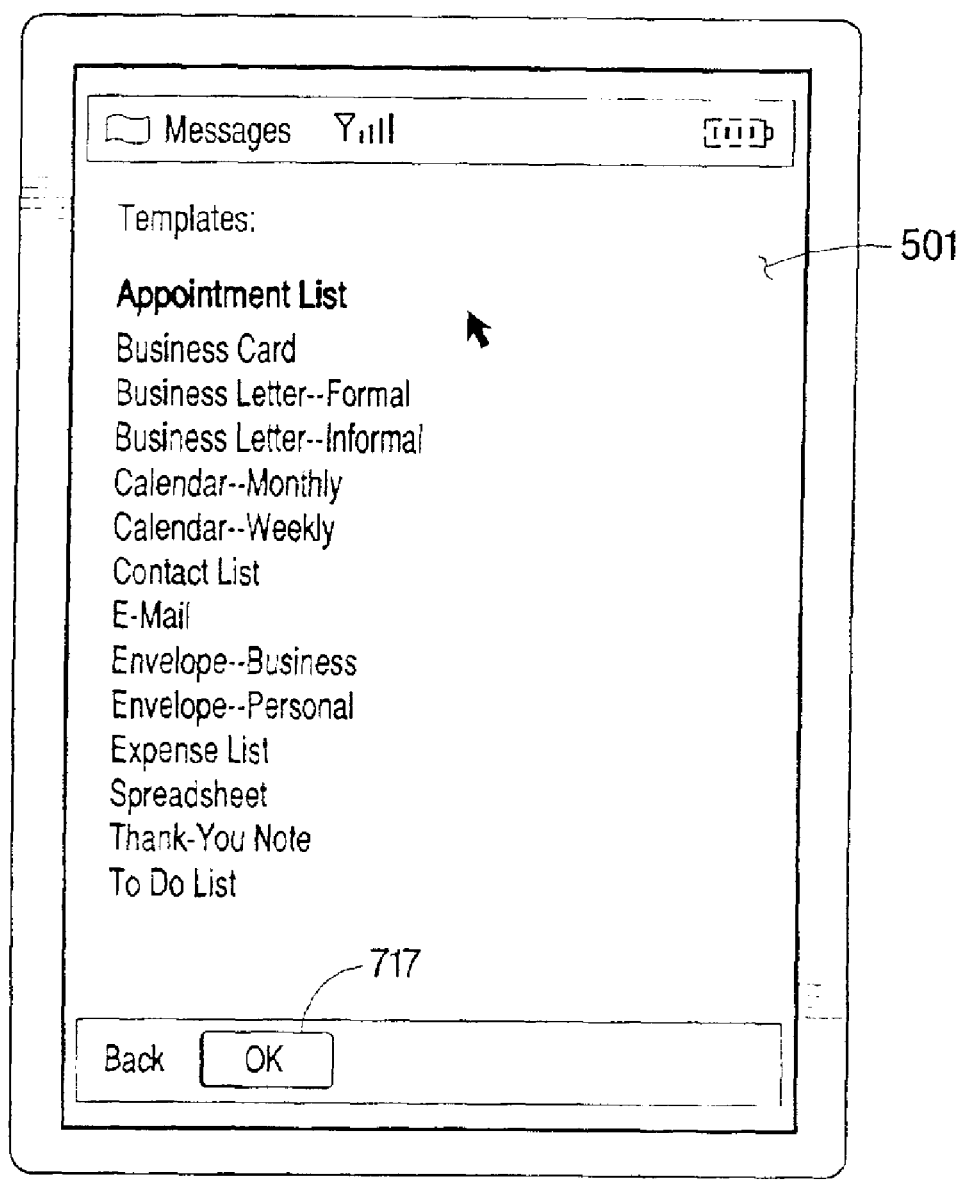

A template option is shown as Select Template 713. A user can make selections, for example, using a stylus and the cursor 701. If the user selects ("clicks" on) this pseudo-hyperlink text or activates the OK soft key 715, a detection is made, at 607 (FIG. 6), and a list of available templates is displayed, at 609, by the display 501. An example of the list of templates displayed in display 501 is depicted in FIG. 7E. Each template, presents a high-impact graphic and/or pre-defined layout residing in the PDA of one embodiment of the present invention. Data such as contacts, appointments, notes, task lists, and so on can be printed using the templates with the resulting output being much higher in presentation quality than with simple formatting. In this area, just the list of available templates is displayed. Corresponding pictures or descriptions can be accessed for each template by making a special selection of the template. Alternatively, thumbnails of the templates can be displayed in the display area, provided that the graphics capability of the display is sufficiently powerful. The user selects the desired template to apply to the information to be printed. For example, if the user wishes to print out a "business card," the user selects the business card template. If there are more than one business card options, selection of "business card" in the selection area will result in a list of all available business card templates. Alternatively, all business card templates can be directly displayed in the area and one business card template includes a company logo and design layout for the user the PDA.

If the user has a report stored as a note in the PDA and wishes to print out a copy to submit to the user's employer, the user can select a template with the company letterhead at the top and the user's signature information at the bottom. The listed templates are customizable. In addition, the user can upload templates to the PDA as well as remove installed templates in order to manage available memory space. Returning now to FIG. 6, upon a user selection, print data is formatted in a template, at step 611. Once a user has selected a print option from the pseudo-hyperlink text area of the display 501, and either clicked on the pseudo-hypertext or activated the soft key OK 717 the selected print function is performed, at step 613.

The user may print by reference in any of the displayed print options. Rather than burdening the portable device with the need to maintain the complete full length information set (which some types of devices may do with extended memory size), the portable device may simply maintain a Web address, a Uniform Resource Locator (URL), to the desired web page and full length information. Because of the limited resources typically available on the portable device, a browser operating in the portable device accesses only a truncated version of the web page. When the user elects to print the web page by reference, a Web address for the web page is sent, for example, to a printer or to a computing system connected with the printer. The computing system uses the Web address to access the full version of the web page and oversees printing of the full web page on the printer.

Figure 7F:
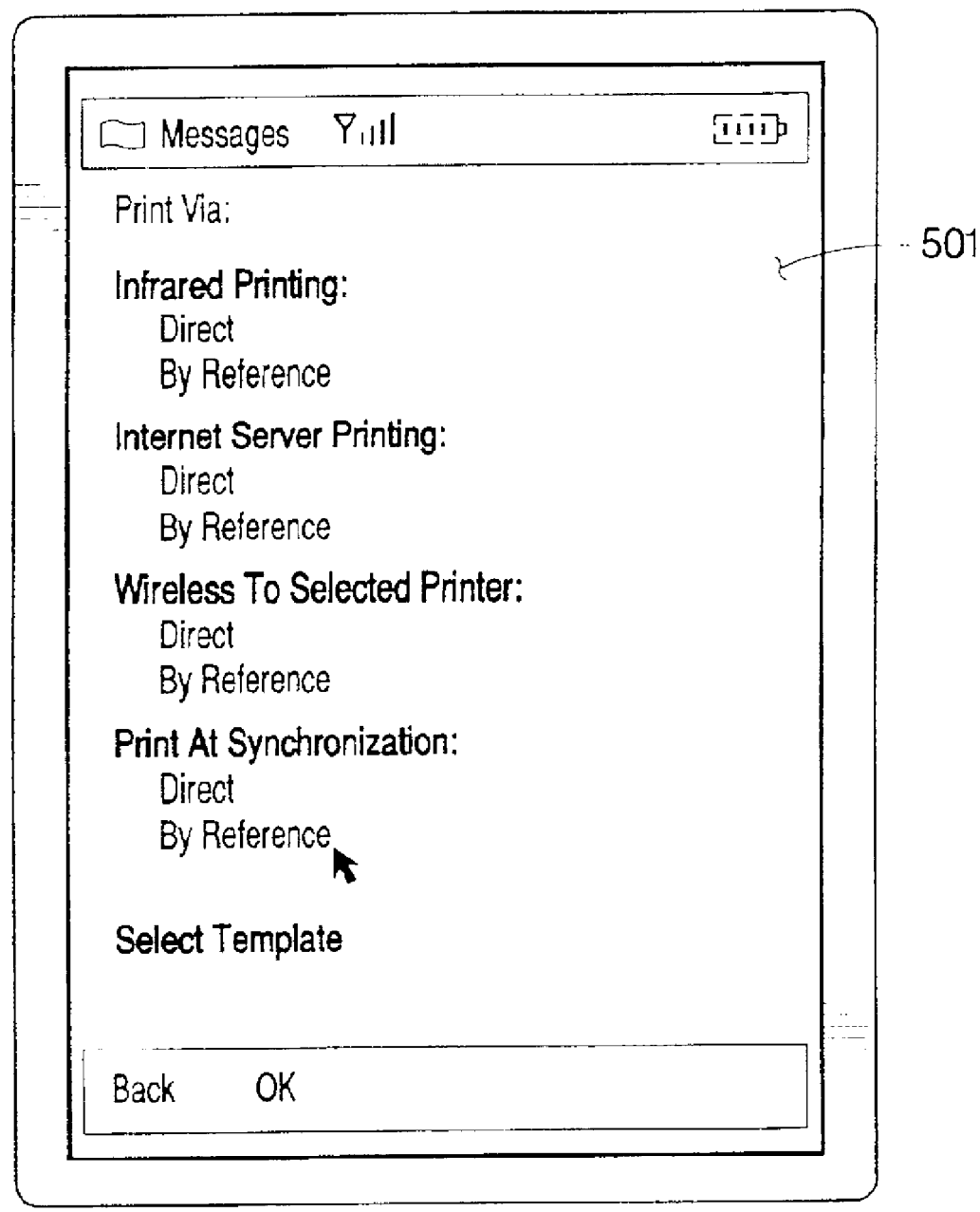

It is a feature of the present invention that the user may elect to delay printing until some future event occurs. Synchronization between a user's PDA 119 and the user's computer equipment 113 is an ideal event for the delayed printing to occur. If the user selects "print at synchronization" and "direct" from the display screen 501 illustrated in FIG. 7F, the tag that is associated with the truncated information set that was displayed is placed in the PDA's memory and a flag is set to cause printing to occur when the PDA is synchronized.

Figure 8:
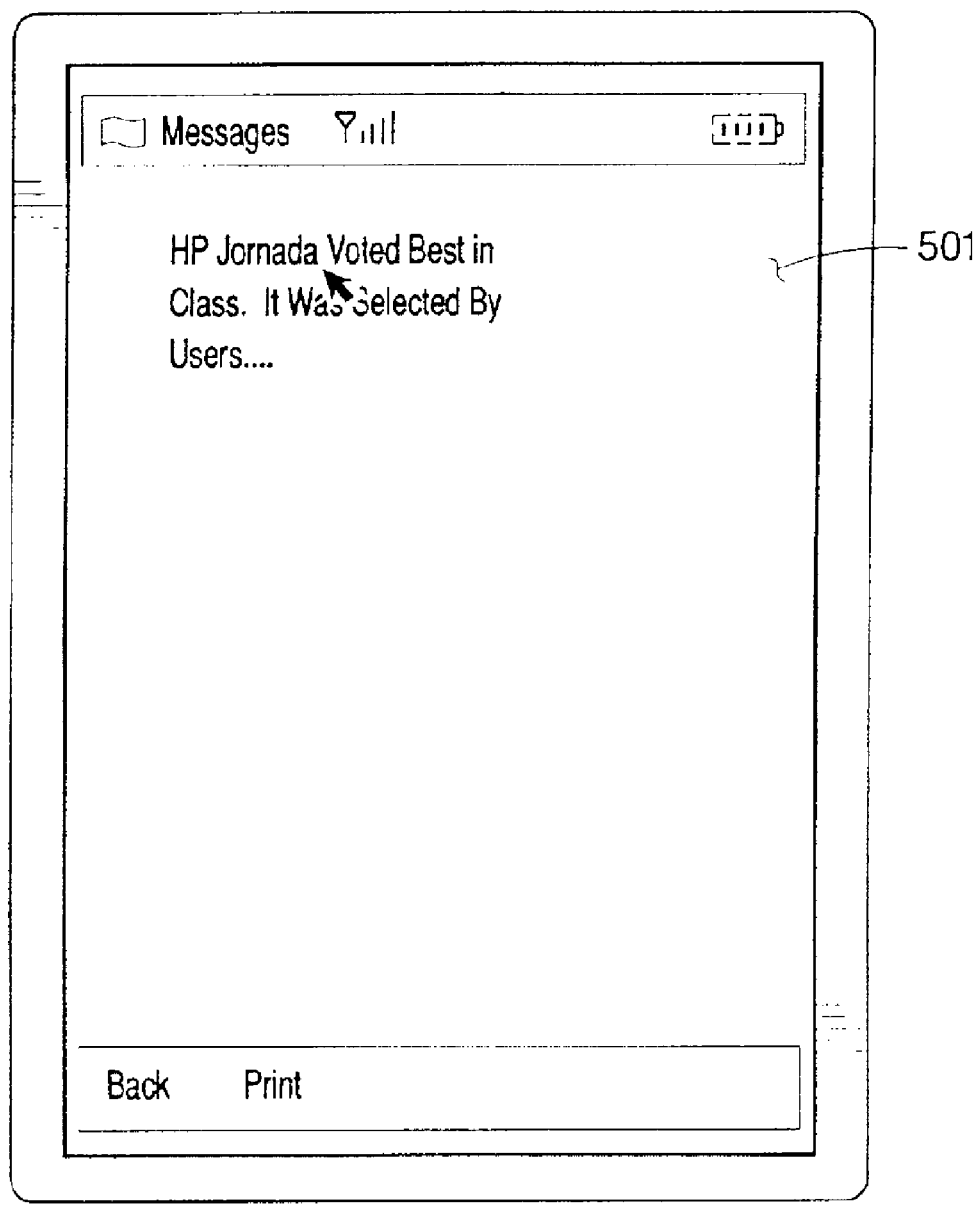
FIG. 8 is an illustration of the display screen for the portable device of FIG. 5 showing a screen encountered by the user while using the portable device.

Alternatively, portions of the truncated information set may be tagged for delayed printing. These portions can be single words, as illustrated in FIG. 8, or extended portions of text, images, or graphics. Considering FIG. 8, a single word is specially identified by the service provider server as having additional full length information available for printing. The user can "click" on the identified word to cause the full length information to be recalled by the service provider server and delivered to the user's printer, either during the user's current session or delayed until, for example, during synchronization.

Figure 9A:
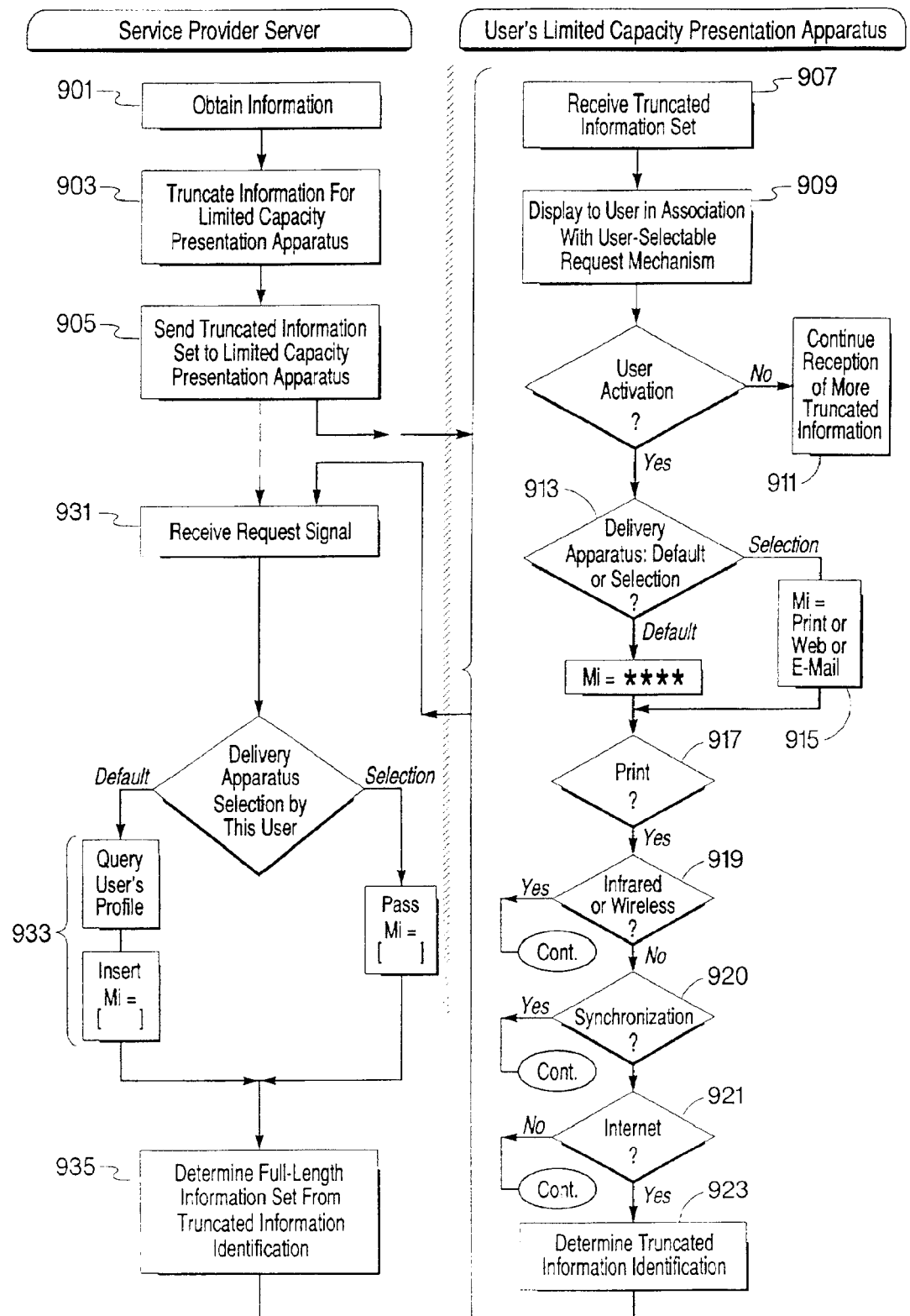
FIGS. 9A and 9B, taken together, is a flowchart of a process of providing full-length information that may be employed in the present invention.
Figure 9B:
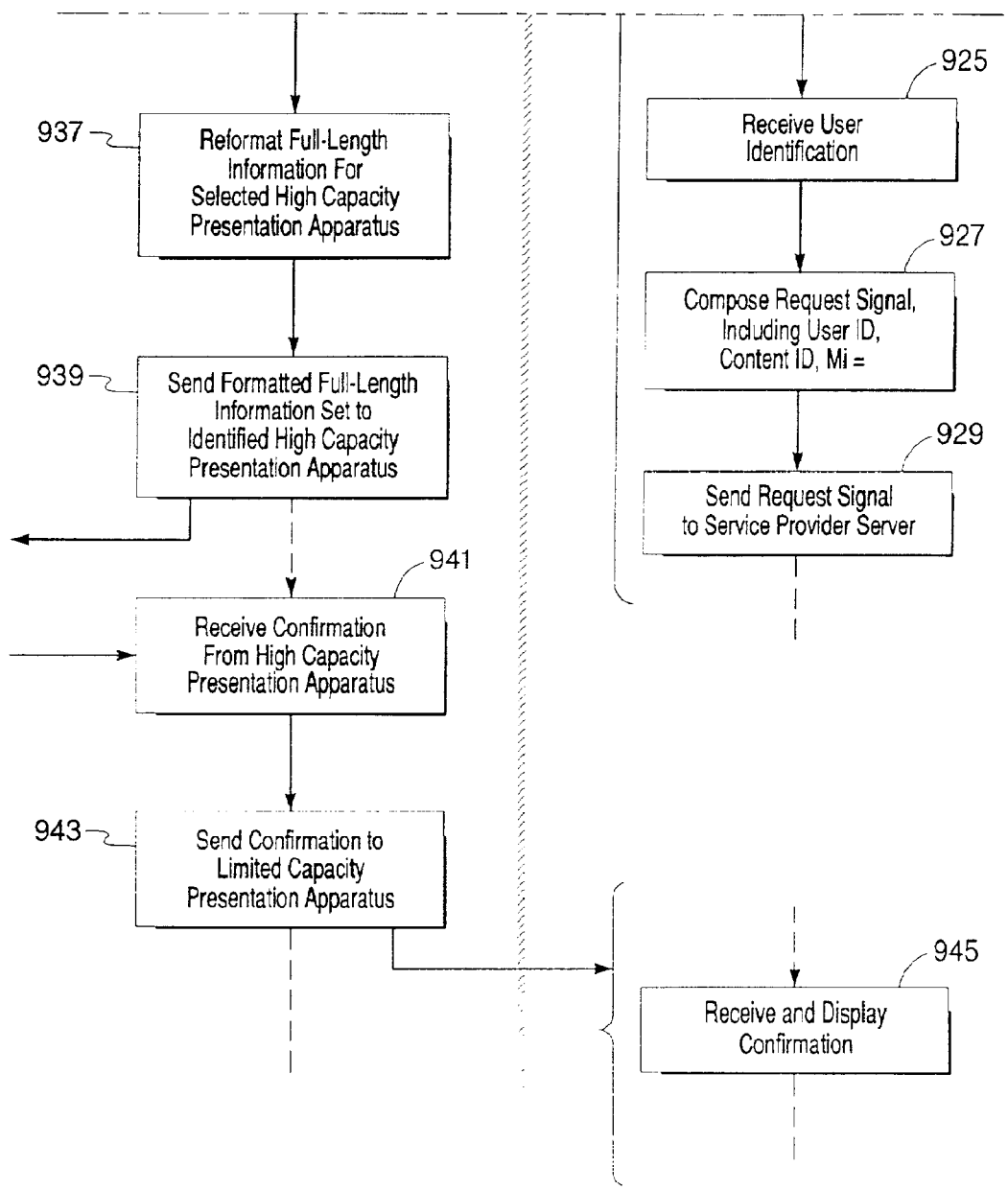

Since the portable device has a limited-capacity presentation capability, as mentioned earlier, it is desirable to reduce the amount of information expressed in a display (or other apparatus for presenting material to a human). Also, as mentioned earlier, users of the limited-capacity device often want more information than just the truncated version being displayed. In an embodiment of the present invention, the general process of information and signal exchange between the server 101 and the limited capacity presentation apparatus, the portable device, is shown in the flowchart of FIGS. 9A and 9B. The left half of this flowchart is directed to the process followed by the server in realizing an embodiment of the present invention. The right half of this flowchart is directed to the process followed by the limited capacity presentation apparatus in realizing an embodiment of the present invention. Interchange of information and signals between the two entities is asynchronous and each of the two entities will be undertaking other tasks while open to a response from the other entity.

The server obtains information, at 901, from content providers and truncates (or otherwise compresses) the information, at 903, for delivery to limited capacity presentation apparatus. The truncated information is sent to the limited capacity presentation apparatus, at 905. The limited capacity presentation apparatus receives the truncated information, at 907, and displays the truncated information to the user along with a user-selectable request mechanism, at 909, to enable the user to request full-length information to be sent to another apparatus that has capacity for presentation of large amounts of information, as described earlier. If the user makes no selection, the limited capacity presentation apparatus continues to receive and display truncated information, at 911. If the user selects a set of truncated information for full-length delivery, a determination, at 913, of whether the pre-established high capacity presentation apparatus of the user's profile is to be used or whether the user wants to select a different high capacity presentation apparatus. In a preferred embodiment, the selection, at 915, is among a printer (PRINT), a web page (WEB), or e-mail message (EMAIL).

A selection of PRINT provides a display to the user on the portable device display screen 501 as described above in association with FIGS. 5, 6, 7, and 8. Thus, a print selection is detected, at 917, and the options of infrared, wireless, and synchronization are determined not to have been selected, at 919 and 920. When the Internet Server Printing is detected as selected, at 921, the portable device proceeds in getting a full-length information set printed.

The information service provider identifies each truncated information set with an identification number, a tag, which is generally not made available to the user. This identification number, however, is returned to the information service provider if the truncated information is selected by the user. Thus, the limited capacity presentation apparatus determines the truncated information identification, at 923, and recalls the user identification, at 925. These two identifications and the portable device selection or default are composed into a request signal, preferably an HTML formatted signal, at 927, and sent to the server 101, at 929.

Upon receipt of the request signal, at 931, a determination of the user's selection/default choice of portable device is made, at 933. The desired full-length information is identified from the truncated information identification of the request signal, at 935, and the full-length information is reformatted, at 937, to be compatible with the high capacity presentation apparatus determined in the delivery apparatus step. The formatted full-length information is then sent to the identified high capacity presentation apparatus, at 939. In advanced implementations of this embodiment, the high capacity presentation apparatus is programmed to provide a response indicating that the full-length information has been received and/or presented. This response is received by the server, at 941, and a confirmation is sent to the limited capacity presentation apparatus, at 943. The limited capacity presentation apparatus displays the confirmation, at 945.

Figure 10A:
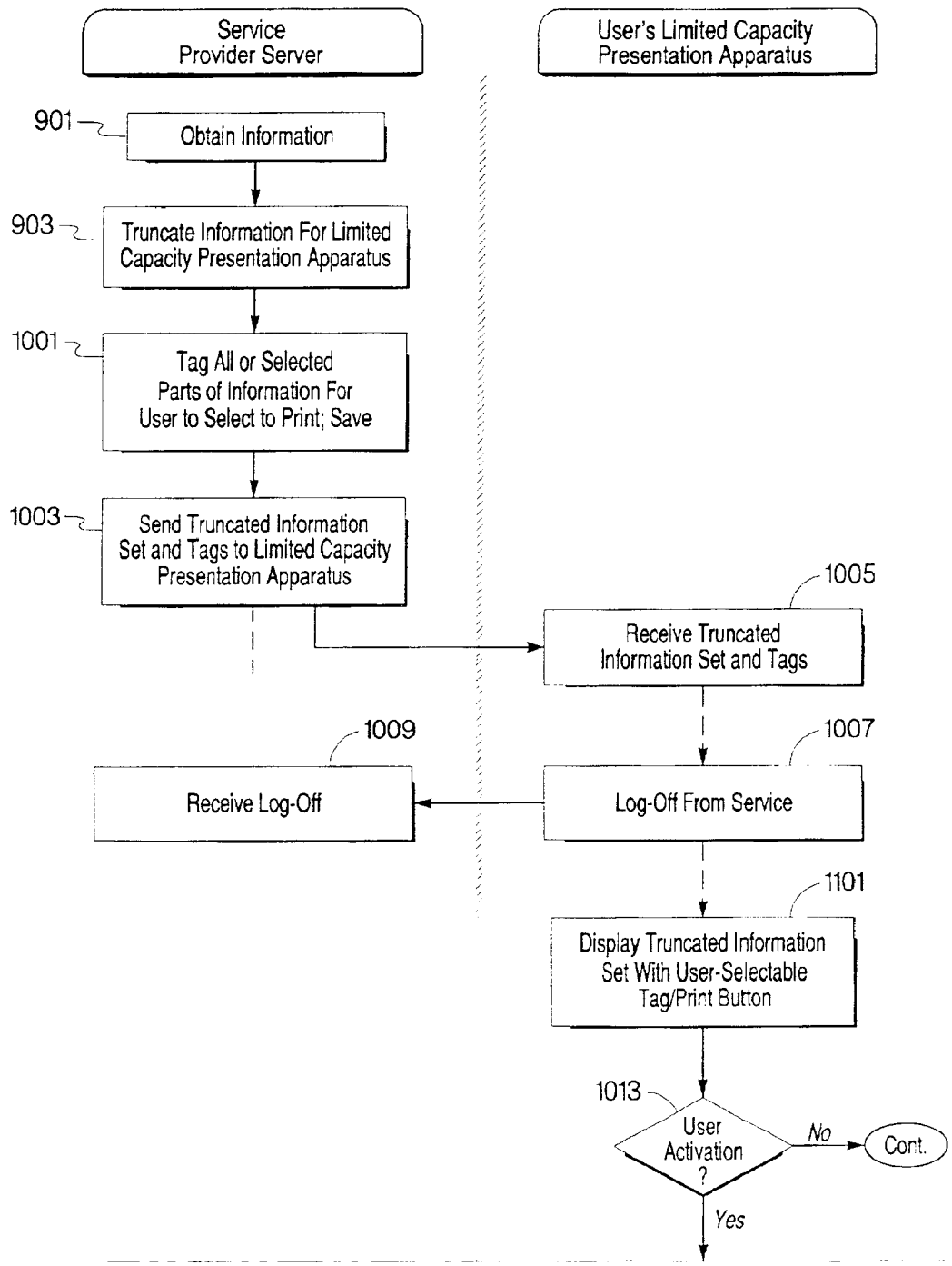
FIGS. 10A–10C, taken together, is a flowchart showing the process of obtaining, selecting, and causing the delayed printing of information in accordance with the present invention.
Figure 10B:
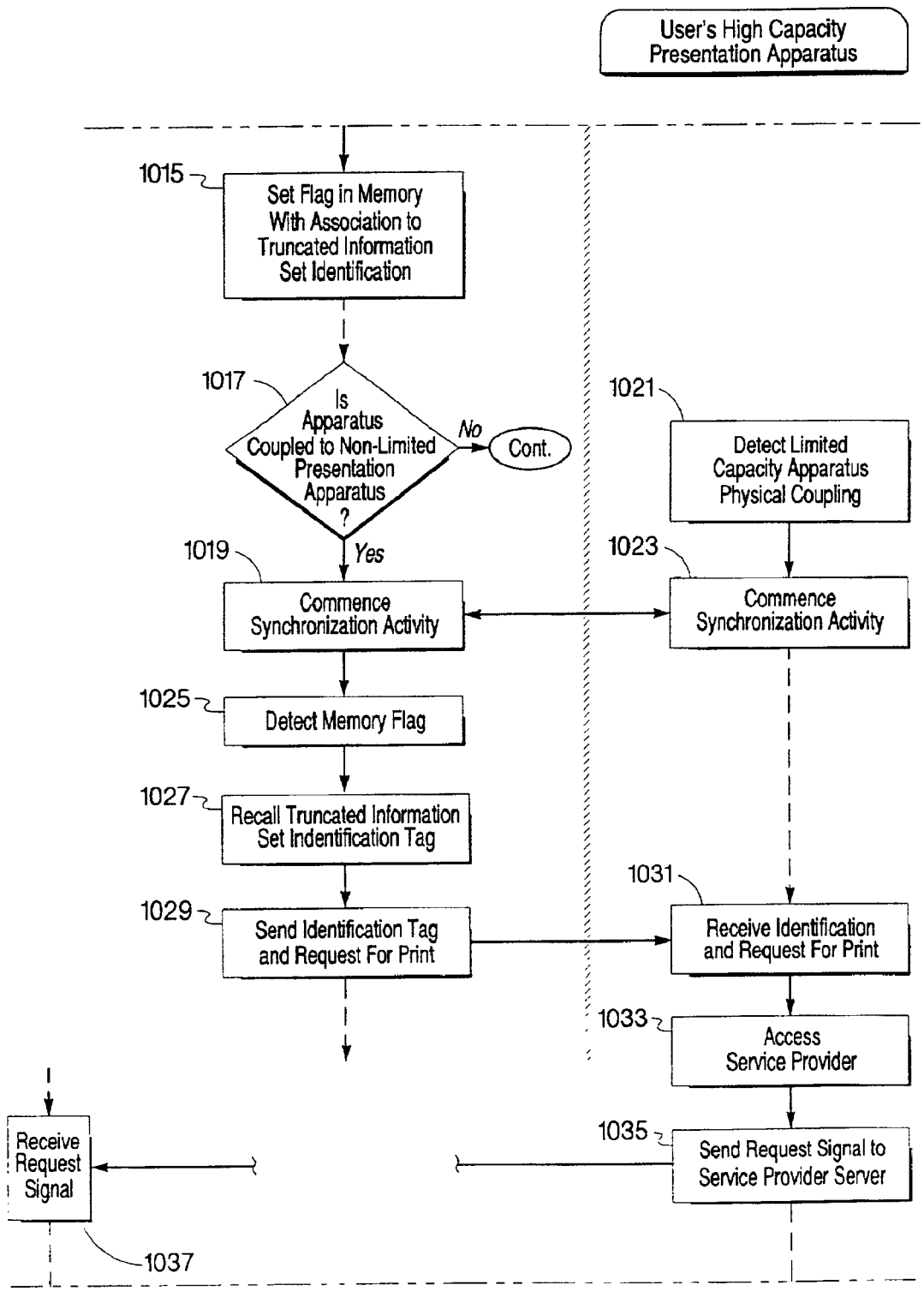
Figure 10C:
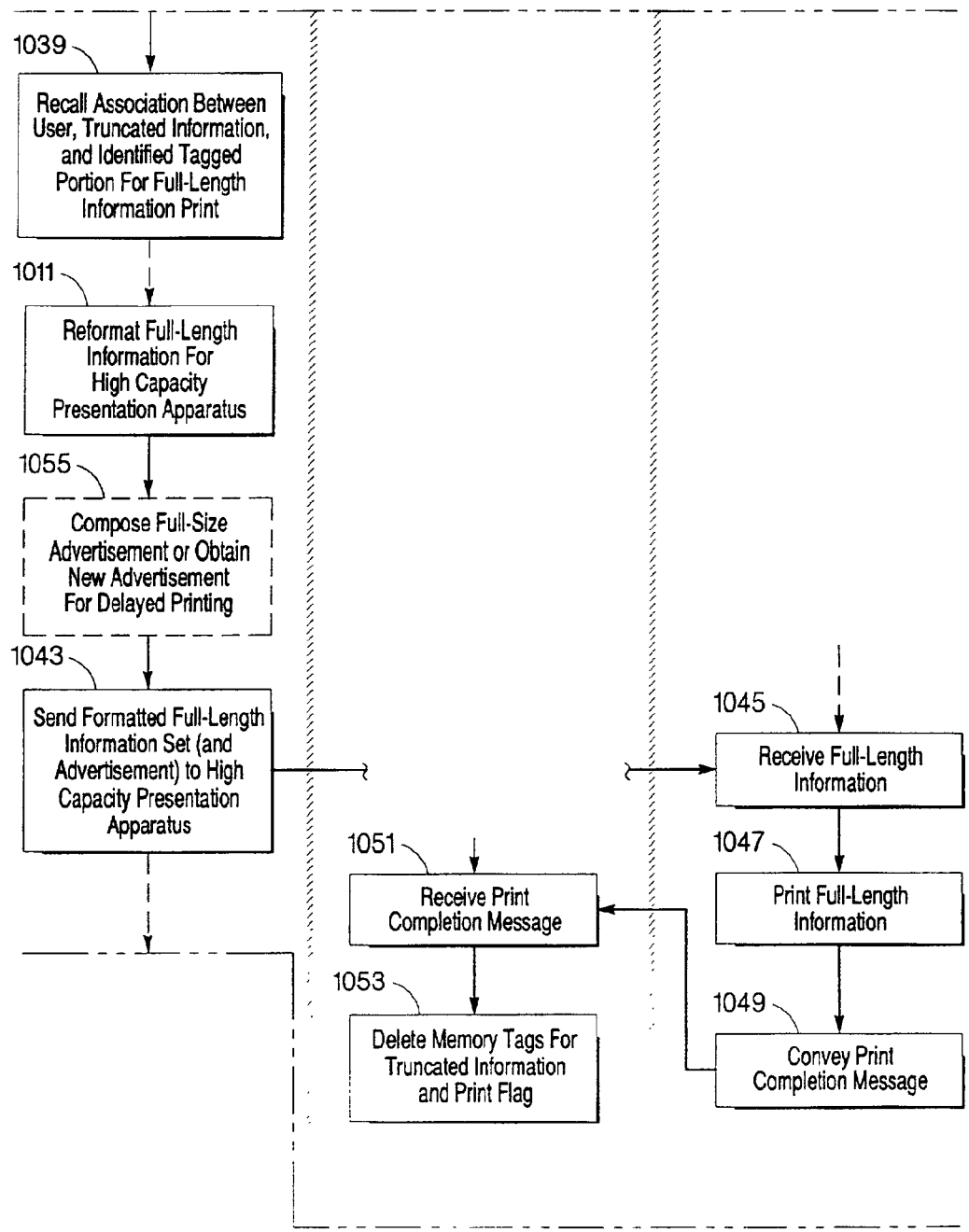

It is often the case that the portable device user accesses the device when the device is not logged on to the service provider's system. Such off-line use provides the opportunity for the user to gain full appreciation of the present invention. As shown in the flowchart of FIGS. 10A, 10B, and 10C, taken together, the service provider server obtains information, 901, and truncates the information for the limited capacity display of the portable device, 903, as described previously. In preparation for this type of delayed print operation, the service provider server tags the truncated information (or selected parts or particular words or concepts) with an identifier and saves the tag(s), at 1001. The service provider server then sends the truncated information set and the tags to the limited capacity presentation apparatus, at 1003. The user's limited capacity presentation apparatus, the portable device, receives the truncated information set and tags, at 1005, and continues to respond to the user's requests in conventional fashion. At some time, the user logs-off from the service provider's service, at 1007, and the service provider server receives such a log-off at 1009. Later, the user—without logging on to the service provider's service—accesses the material stored in the portable device, including the truncated information set delivered earlier from the service provider. The portable device displays, at 1011, the truncated information set and, preferably, one or more user-selectable soft-key "print" buttons as described above (alternatively, selectable icons indicating the tagged information, pseudo-hyperlink text highlighting, hard keys, or similar user selectable screen devices may also be used). If the user does not activate the "print" button, at 1013, the portable device continues to respond to the user's commands in conventional fashion. If, however, the user activates the "print" button, a flag is set, at 1015, in the portable device's memory and an association is made to the truncated information set and the tag established by the service provider and stored in the portable device memory.

When a coupling of the portable device to a high capacity presentation apparatus (such as the user equipment computer 113 via the PDA synchronization port 121 or a similar device docking station) is detected, at 1017, synchronization activity between the portable device and the user equipment 113 commences, at 1019. The PDA synchronization port 121 and user equipment 113 also detect the presence of the portable device, at 1021, and commences the synchronization, at 1023. In a preferred embodiment, this synchronization activity concludes and stimulates a detection of the set memory flag, at 1025, a recalling of the truncated identification set identification tag, at 1027, and the sending of a message including the identification tag and a request for print, at 1029. The high capacity presentation apparatus receives the identification tag and the request for print message, at 1031, and accesses the service provider, at 1033. In one embodiment, the user, upon service inception with the service provider, lists several devices for access as part of the user's profile stored with the service provider. The portable device (and its characteristics) and the user's high capacity presentation apparatus (and its characteristics) are listed in the profile and service is granted by the service provider to the user via the apparatus actually making the connection to the service. Once the service provider server has been accessed and the user identified to the service provider, a full-length information set request signal is sent to the service provider server, at 1035, to cause the service provider, once the request signal is received, at 1037, to deliver the full-length information.

Responsively, the service provider recalls the association between the user, the truncated information, and the identified tagged portion of the full-length information set, at 1039, for printing by the user's high capacity presentation apparatus. The full-length information is reformatted, at 1041, and sent to the high capacity presentation apparatus, at 1043. Upon receipt, at 1045, the high capacity presentation apparatus (user equipment 113) prints the full-length information on a printer (printer 115), at 1047. After completing the printing, the high capacity presentation apparatus conveys a completion message, at 1049, to the user's synchronized portable device. In response to the receipt of the message, at 1051, the portable device deletes the memory tags for the truncated information and the print flag, at 1053.

The later delivery of information for printing offers an opportunity for the service provider to deliver updated advertising materials to the user. The truncated information set initially sent to and displayed on the user's portable device was likely accompanied by one or more advertisements that were compacted and sized for the limited-size display of the portable device. See, for example, U.S. patent application Ser. No. 09/641,617 "Document Delivery System with Automatically Adjusted Copy Inserts", filed on Aug. 17, 2000 an behalf of Currans et al. and U.S. patent application Ser. No. 09/738,199 "Method and Apparatus to Maximize Advertising Revenue", filed on Dec. 15, 2000 on behalf of Castle et al. Once a full-length information set is being delivered, a larger advertisement may also be delivered with the full-length information. Accordingly, an optional step in the service provider server's preparation of a full-length information set for delivery to the user's high capacity presentation apparatus is that of recalling and composing, at 1055, a full-sized advertisement corresponding to the reduced size advertisement originally delivered. Alternatively, a new advertisement may be generated for delivery.

Figure 11A:
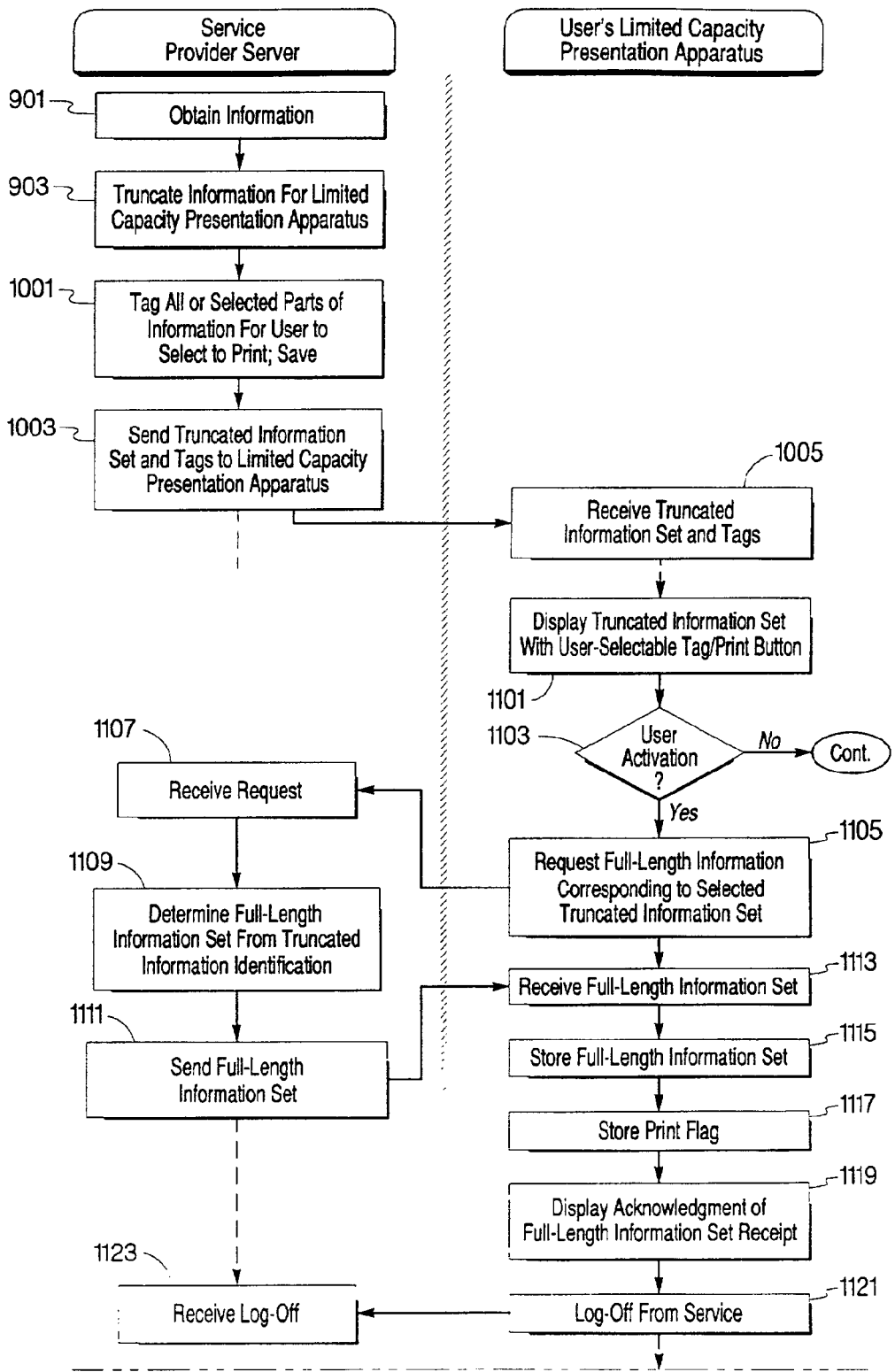
FIGS. 11A and 11B, taken together, is a flowchart showing an alternative process of obtaining, selecting, and causing the delayed printing of information in accordance with the present invention.
Figure 11B:
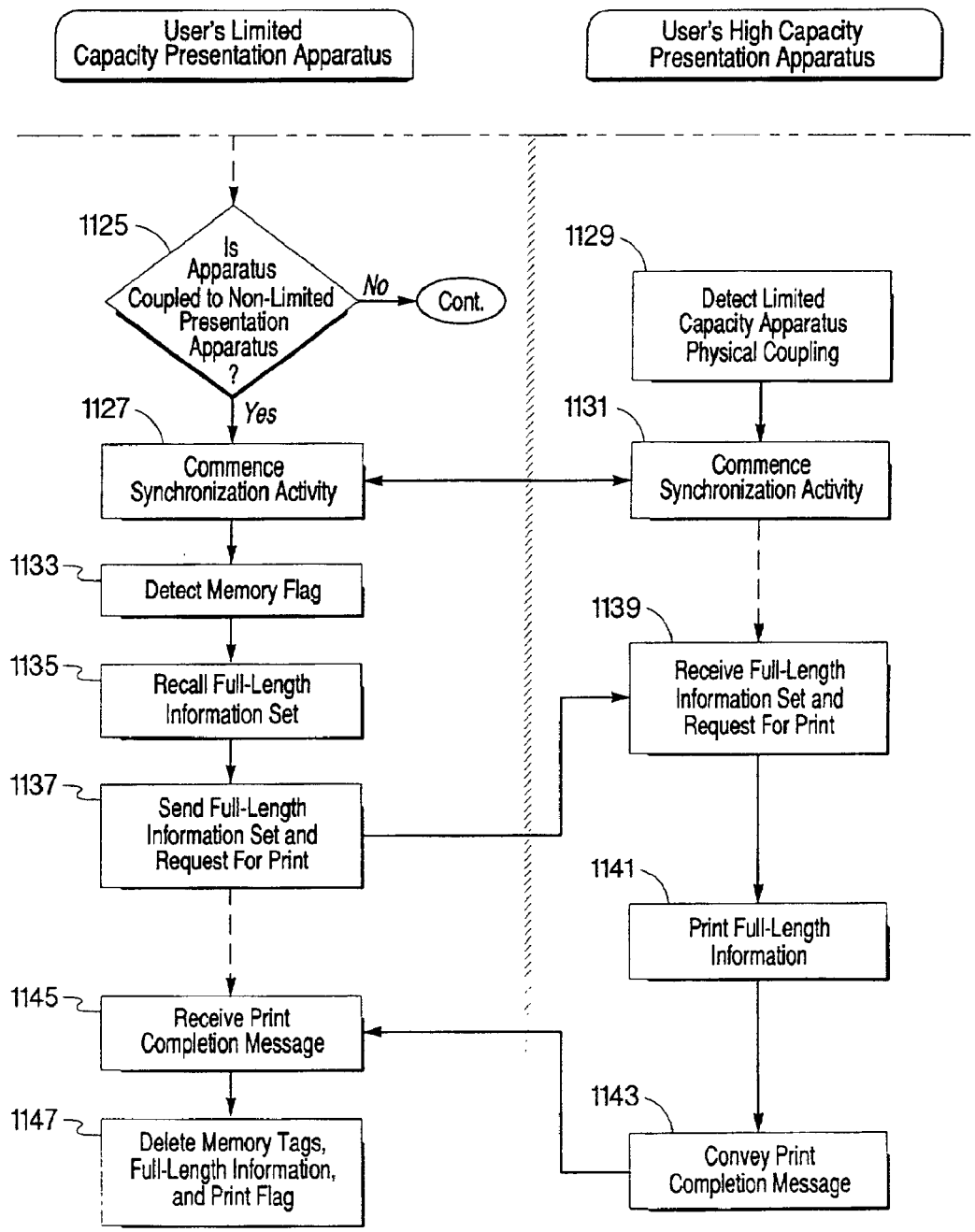

In an alternative embodiment of particular applicability where the portable device is equipped with sufficient memory, the full-length information set is conveyed to and stored in the user's portable device. A preferred process employed to do so is shown in FIGS. 11A and 11B, taken together. As described previously, the service provider obtains information, 901, and truncates the information for the limited capacity display of the portable device, 903. In preparation for a delayed print operation, the service provider tags the truncated information (or selected parts or particular words or concepts) with an identifier and saves the tag(s), at 1001. The service provider then sends the truncated information set and the tags to the limited capacity presentation apparatus, at 1003. The user's limited capacity presentation apparatus, the portable device, receives the truncated information set and tags, at 1005, and displays, at 1101, the truncated information set, preferably, one or more user-selectable soft-key "print" buttons (alternatively, selectable icons indicating the tagged information, pseudo-hyperlink text highlighting, hard keys or similar user selectable screen devices may also be used). If the user does not activate the "print" button, at 1103, the portable device continues to respond to the user's commands in conventional fashion. If, however, the user activates the "print" button, a request for the full-length information corresponding to the selected truncated information set is conveyed to the service provider, at 1105. Upon receipt of the request, at 1107, the service provider server determines the full-length information set from the truncated information identification, at 1109, and sends the full-length information set to the user's portable device, at 1111. The full-length information set is received by the user's portable device, at 1113, and stored in the memory of the user's portable device, at 1115, along with a print flag, at 1117. For the user's convenience, an alternative embodiment includes the step of notifying the user of the receipt of the full-length information set with a displayed acknowledgement, at 1119.

At some time, the user logs-off from the service provider's service, at 1121, and the service provider server receives such a log-off at 1123. Later, the user couples the portable device to the high capacity presentation apparatus (the user computer equipment 113 via the PDA synchronization port 121 or a similar device docking station). When this coupling is detected by the portable device, at 1125, synchronization activity between the portable device and the user computer equipment 113 commences, at 1127. The PDA synchronization port 121 and user computer equipment 113 also detect the presence of the portable device, at 1129, and commences its synchronization process, at 1131. In this alternative embodiment, a detection of the set memory flag occurs, at 1133, the full-length identification set is recalled, at 1135, and is sent along with a request for printing, at 1137. After receipt of the set and request, at 1139, the high capacity presentation apparatus prints the full-length information, at 1141, and returns a print completion message, at 1143. When this message is received by the user's portable device, at 1145, the portable device deletes the full-length information set, the memory tags, and the print flag, at 1147.

Thus, a method and apparatus for providing greater depth of information to users of limited capacity presentation apparatus has been described. Users can identify from truncated (or otherwise compressed) information presented at the limited capacity presentation apparatus for which more depth is requested. Printing of full-length information, from which the truncated information is developed, can be delayed until the user's portable device is coupled to a high capacity presentation apparatus.

We claim:

1. A method for printing information selected at a portable device, comprising the steps of:
   accessing information from a remote server;
   receiving and displaying a truncated portion of said information at the portable device;
   accepting, at the portable device while said truncated information is displayed, an activation to print said information;
   storing an indication of said activation in the portable device;
   detecting a coupling to a high capacity presentation apparatus; and
   conveying, in response to said detection, said stored indication to said high capacity presentation apparatus, whereby said high capacity presentation apparatus obtains and prints said information.

2. A method in accordance with the method of claim 1 further comprising the steps of:
   receiving said information at the portable device in response to said accepted activation;
   storing said information at the portable device; and
   conveying, in response to said detection, said stored information to said high capacity presentation apparatus.

3. A method in accordance with the method of claim 1 further comprising the step of receiving an acknowledgement of print completion from said high capacity presentation apparatus.

4. A method in accordance with claim 2 further comprising the step of receiving a limited size advertisement for display with said truncated portion of said information.

5. A method in accordance with the method of claim 4 further comprising the steps of receiving a full size advertisement with said full length information and conveying, in response to said detection, said full size advertisement to said high capacity presentation apparatus for printing with said full length information.

6. A method in accordance with the method of claim 1 further comprising the step of synchronizing, in response to said detection, the portable device with said high capacity presentation apparatus.

7. A portable device for printing selected information on a high capacity presentation apparatus, comprising:
   a wireless transmitter that accesses information from a remote server;
   a wireless receiver that receives a truncated portion of said information;
   a limited capacity display that displays said received truncated portion of the information;
   an actuator that accepts a user initiative to print the information while said truncated portion is displayed;
   a memory that stores an indication of said actuator acceptance; and
   a coupling and synchronizing apparatus to synchronize the portable device with the high capacity presentation apparatus and to convey said stored indication to the high capacity presentation apparatus whereby the high capacity presentation apparatus is caused to obtain and print the information.

8. A method for printing portable device selected information at a high capacity presentation apparatus, comprising the steps of:
   accessing information specified by the portable unit;
   generating a truncated portion of said information at the portable device;
   attaching an identification tag to said truncated portion;
   transmitting said truncated portion and tag to the portable device;
   saving said tag with an association to said accessed information in memory;
   receiving a request, including said tag, from the high capacity presentation apparatus associated with the portable unit to transmit said information to said high capacity presentation unit;
   recalling said association between said tag and said accessed information; and transmitting said accessed information to the high capacity presentation apparatus.

9. A method for printing portable device selected information at a high capacity presentation apparatus, comprising the steps of:

detecting a coupling between the portable device and the high capacity presentation apparatus;

commencing a synchronization process with the portable device;

receiving a request for printing a full-length information set and an identification tag associated with said full-length information set;

accessing a remote server and transmitting said tag to said remote server;

receiving said full-length information set from said remote server; and printing said full-length information set.

10. A method in accordance with the method of claim 9 further comprising the step of transmitting an acknowledgement of printing to the portable device in response to said printing step.

11. A method in accordance with the method of claim 10 further comprising the steps of receiving a full sized advertisement with said full-length information set and printing said full sized advertisement during said full-length information set printing step.

12. A method for printing portable device selected information at a high capacity presentation apparatus, comprising the steps of:

detecting a coupling between the portable device and the high capacity presentation apparatus;

commencing a synchronization process with the portable device;

receiving a request for printing a full-length information set and said full-length information set from the portable device at the completion of said synchronization process; and printing said full-length information set.

13. A method in accordance with the method of claim 12 further comprising the step of transmitting an acknowledgement of printing to the portable device in response to said printing step.

14. A method for conveying information in truncated form to a portable device and in full-length form for printing, comprising the steps of:

obtaining information from a content provider;

truncating said information for use by a portable device having limited display capacity;

creating an associated tag for said truncated information;

sending truncated information and associated tag to the portable device;

receiving a request signal including said tag from a high capacity presentation apparatus;

recalling said information associated with said tag; and transmitting said information to said high capacity presentation apparatus.

15. A method in accordance with claim 14 further comprising the steps of transmitting a limited size advertisement to the portable device for display with said truncated information, composing a full size advertisement, and transmitting said full size advertisement with said full length information for printing with said full length information.

* * * * *